May 12, 1953 A. M. MARKS 2,638,555

HEAT-ELECTRICAL POWER CONVERSION THROUGH THE MEDIUM OF A CHARGED AEROSOL

Filed Dec. 14, 1949 6 Sheets-Sheet 1

INVENTOR.
ALVIN M. MARKS
BY M. C. Hayes
ATTORNEY

INVENTOR.
ALVIN M. MARKS

BY M. O. Hayes

ATTORNEY

INVENTOR.
ALVIN M. MARKS

BY M. A. Hayes

ATTORNEY

INVENTOR.
ALVIN M. MARKS
BY
M. A. Hayes
ATTORNEY

Showing The Relation Between $f = \frac{1}{2}\left\{4\sqrt{\frac{1}{1-\gamma}} - 1\right\}$ And
γ = Proportion Of Kinetic Power Converted To Electric Power
At Constant Pressure, Temperature & Volume. Also Showing
The Relation Between $L/D_1 = \frac{\text{Length of conversion nozzle}}{\text{Diameter at throat of nozzle}}$
And γ, For φ = 20°

INVENTOR.
ALVIN M. MARKS
BY
M. A. Hayes
ATTORNEY

Maximum Values Of Mobility Reduced To S.T.P. For Each Velocity Taking $\alpha$=.010. $K_0$ Is Independent Of P INVENTOR.
ALVIN M. MARKS
BY
[signature]
ATTORNEY Patented May 12, 1953 2,638,555

UNITED STATES PATENT OFFICE 2,638,555

HEAT-ELECTRICAL POWER CONVERSION THROUGH THE MEDIUM OF A CHARGED AEROSOL

Alvin M. Marks, Beechhurst, N. Y.

Application December 14, 1949, Serial No. 132,963

43 Claims. (Cl. 310—4)

(Granted under Title 35, U. S. Code (1952), sec. 266)

The invention described herein may be manufactured and used by or for the Government of the United States of America for governmental purposes without the payment of any royalties thereon or therefor.

This invention relates to the production of electrical power from heat without the intervention of moving mechanical parts, except in the auxiliaries. The type of heat-to-electrical power conversion device herein employed is generally known by the term "ion-convection generator." Prior art devices of this general type have produced extremely high voltages and very low current densities, and were thus not suitable for purposes of general utility, such as for ordinary power requirements for the running of electrical motors or lighting circuits. The prior art devices have been rather limited to employment for the operation of X-ray machines and the like where high voltages and low currents were serviceable. The present invention relates more particularly to a low-voltage-high-current device of the ion-convection type.

Advantages over conventional devices, such as turbo-generators, which are complex rotating machines, include comparative simplicity, higher efficiency, and freedom from vibration. The consequent economic benefits are lower capital investment, lower maintenance, and lower operating costs.

It is an object of this invention to employ heat sources such as oil, coal, or atomic reactors to supply the source of heat to a working substance such as a gas or a vapor and to cause ions or charged particles to be formed within this working substance, through the processes of ionization, and to utilize these ions or charged particles under such conditions of operation as to produce electrical power at a comparatively low voltage and high current.

It is another object of this invention to establish the geometrical and physical conditions necessary for the construction of a low voltage and high current generator.

It is a further object of this invention to establish critical values for the efficient operation of devices of this nature, establishing such values particularly in connection with the proportion of kinetic power converted to electric power, and generally to relate the electrical quantities of current density, voltage and power density to the geometry of conversion space, more particularly to its length and area, and to the physical quantities such as mass-flow, velocity and particle size.

It is an object of this invention to provide aerosol particles of the size required for the proper operation of the working substances employed. The particle sizes referred to are the mean diameters of the particles of aerosol mixture employed in connection with or as a part of the working substance, gas or vapor. The aerosol particles are employed as a carrier for the electric charges.

It is another object of this invention to utilize simultaneously both the positive and negative charges created in the ionization process.

It is another object of this invention to provide novel ionization means.

It is still a further object of this invention to employ means for increasing the value of the minimum sparking potential of the gas employed as a carrier of the aerosol particles, in order to enable the efficient conversion of kinetic power to electrical power at lower voltages and higher current densities.

It is a still further object of this invention to provide a novel electro-thermodynamic cycle in which combustion and ionization stages are combined.

This invention permits the direct conversion of heat to electric energy at extremely high initial temperatures, corresponding to the maximum attainable temperature, limited only by the static strength of materials at these temperatures. Prior-art devices, such as turbines, were limited to a maximum of about 700° K. operating temperature due to the necessity of employing materials in the rotating parts capable of withstanding high centrifugal and other forces. For this reason a high Carnot Efficiency can be obtained with the present invention, utilizing one or more metal or other gaseous high temperature working materials, in binary or trinary cycles. Thus, for example, in the present invention:

$$\text{Carnot Efficiency} = \frac{T_1 - T_2}{T_1} = \frac{2300-300}{2300}\,100 = 87\%$$

This may be compared to a turbogenerator running at 700° K.:

$$\text{Carnot Efficiency} = 100\,\frac{700-300}{700} = 57\%$$

This indicates an increased output with the present invention of about 50% with the same fuel.

Further objects and advantages of this invention as well as its construction, arrangement, and operation will be apparent from the following description and claims in connection with the accompanying drawings, in which:

Before proceeding to the description of the drawings, certain physical conditions of operation are predicated, from which my mathematical physics analysis follows.

The purpose of the mathematical physics anlysis presented herein is to derive equations for voltage, current and electrical power, and to relate these quantities to the mechanical quantities of kinetic power, velocity of the working substances or gas, and to the geometric construction of the converter space, particularly the length and area thereof. In addition, account is taken of the proportion of mechanical power converted to electrical power, the size of the aerosol particles employed, and their mobility in the electric field, as related to viscous or frictional power loss. In addition, consideration is given to the possibility of electrical flashback occurring in the conversion space, due to excessive electrical intensities being built up, and a limitation is established based on the known equation for minimum sparking potential.

Figure 12:
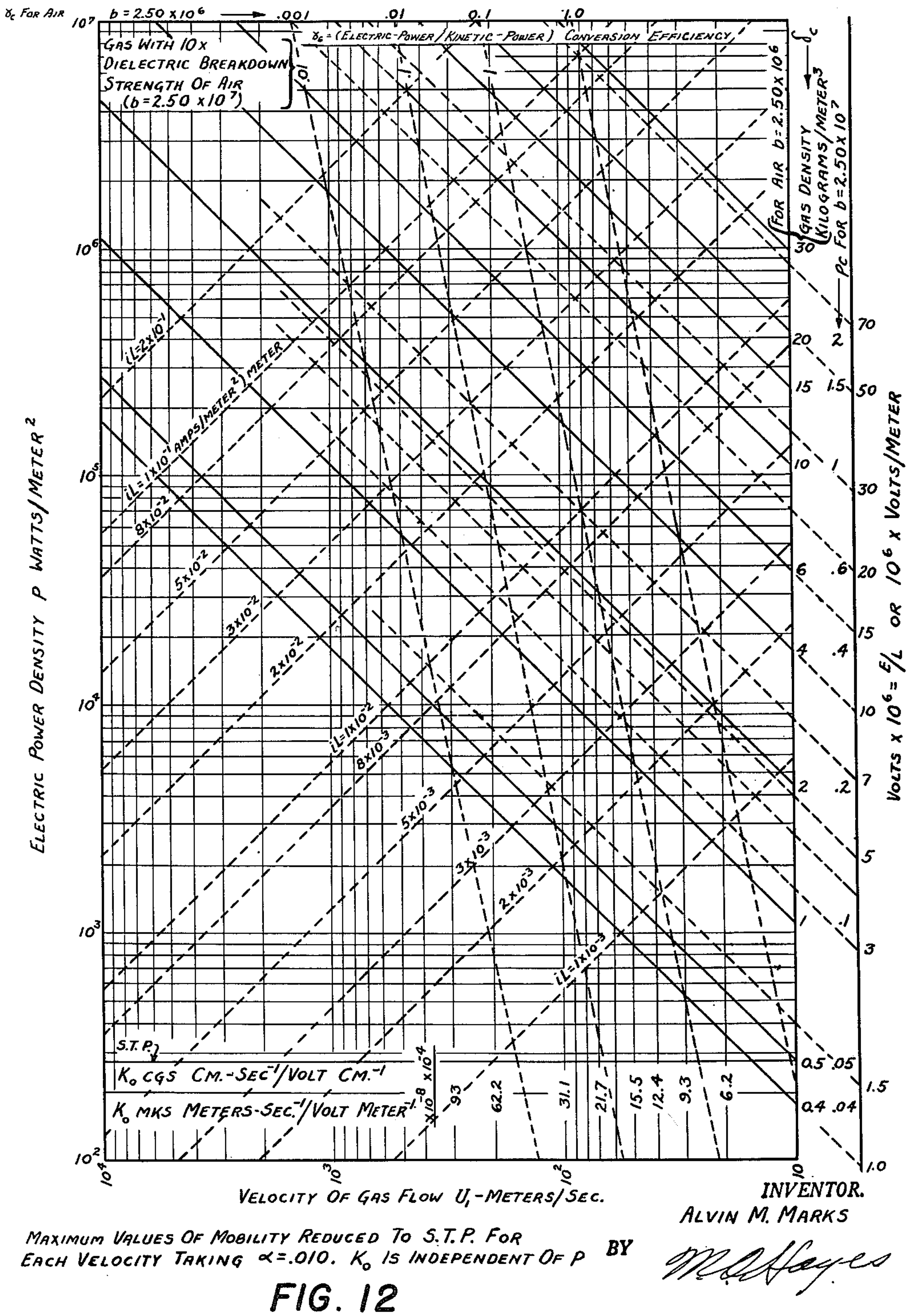
Fig. 12 is a log-log graph, on which is plotted relationships discovered between power density voltage, current, density, nozzle length, gas velocity, conversion ratio, mobility, etc.

Finally, the equations are plotted upon the graph shown in Fig. 12; and sample calculations are made for certain low-voltage-high-current generators, for the purpose of illustrating the construction, particularly the order of the magnitudes of the geometric and physical quantities involved in practicing this invention.

As stated, the derived equations have been simplified by certain assumptions. It will be understood, however, that other conditions of operation may be predicated, and other equations derived as a basis for other embodiments within the scope of this invention. Accordingly, I wish not to be limited by the theoretical matter herein presented, but only by the full scope of the specification and appended claims.

*Symbols and definitions*

Figures 8, 9:
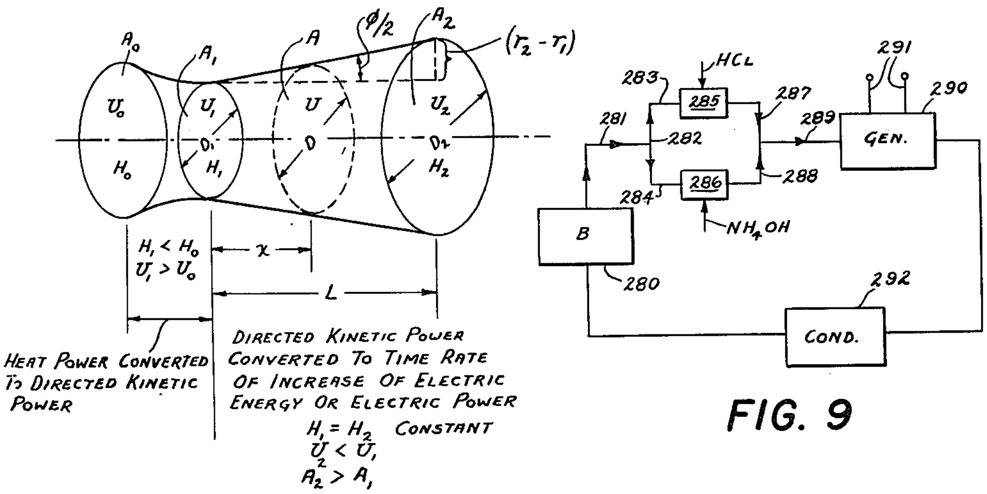
Fig. 8 is a diagram of the nozzle, and shows the various physical-mathematical quantities in relation thereto.
Fig. 9 is a block diagram of one of the thermodynamic cycles employed in connection with this invention, and also indicated method of producing an aerosol.

In Fig. 8, the subscripts 1 and 2 refer to initial and terminal conditions in a nozzle of a device according to this invention: that is, at the high- and low-velocity ends of the conversion space the velocities are $U_1$ and $U_2$ and the cross-sectional area is $A_1$ and $A_2$, respectively. Symbols without subscripts refer to conditions at the generalized cross-sectional area A, unless otherwise specified.

$a$=constant=$\rho/\epsilon_0$ $a_0$=radius of aerosol particle $A$=area of the nozzle at a section a distance $x$ from the inlet nozzle section $A_1$.

$b$=constant of proportionality in sparking voltage in gases equation.

$C$=constant term in sparking voltage in gases equation $C',C''$=constants in the mobility equation $D$=diameter of the nozzle $\mathscr{D}$=mass of solid or liquid aerosol particles per unit volume of gas $E$=total voltage generated between sections $A_1$ and $A_2$.

$e$=charge on the electron, taken also as the unit charge on the ion, or on aerosol particles which may have a positive or negative charge.

(It is understood, however, that in the case of larger charged particles more than one electron charge may be present.)

$f$=a function defined by Equation 66.

$f_1$=a function defined in Equation 68

$f_0$=ratio $p'/p$; or, in the nozzle plate, the ratio of average power density to the power density at the nozzle throat.

$I$=total ion current across the entire section A.

$H_0$=input of the heat content of the gas, prior to expansion, into the nozzle.

$H_1$=output of the heat content of the gas after expansion and upon entrance to section $A_1$;

$H_0$ and $H_1$ can be measured in "kilogram-calories per kilogram per second."

$i$=current density=$\frac{I}{A}$; current per unit area.

$J$=conversion factor between heat units and units of mechanical energy.

$k$=mobility of a charged particle, at section A, (Fig. 8) where the "Mobility" of the charged particle is that velocity imparted to the particle, through the gas in which it is contained, by a field of unit electric intensity. In this definition, the velocity of the particle is considered relative to the gas. That is: $k=(U-U')/X$ $l$=mean free path of gas; $l'$ the same at S. T. P.

$l_0$=distance between nozzles.

$L$=length of the nozzle between sections $A_1$ and $A_2$.

$M$=total mass flow per unit of time flowing across the entire section A. In the steady state this mass flow is constant across all sections, even though the velocity varies from section to section.

$n$=number of charges $e$ per unit volume.

$N$=number of charges $e$ per ion, or charged particle.

$\eta$=coefficient of viscosity in newton-sec./meter$^2$ or 1 m. k. s. unit (10 poise=1 m. k. s. unit of viscosity).

$P$=total electric power converted from kinetic power (due to slowing the motion of the mass) in the entire conversion space from $X=0$ to $x=L$ across the entire area of the nozzle.

$p=P/A$=electric power converted from kinetic power per unit of cross-sectional area in the nozzle; that is, the generated electric power density.

$p'$=average electric power density over the plate containing the nozzle array.

$P_f$=total frictional power loss produced by the relative motion of the ions or charged particles relative to the gas, across the entire area of the nozzle.

$p_f=p_f/A$=frictional power loss per unit of cross-sectional area.

$P_m$=kinetic power, or the flow of mechanical energy due to the velocity of the mass of gas, including the mass of ions or charged particles, passing through the section A.

$P_m=P_m/A$; the average kinetic power per unit area.

$r$=radius of nozzle.

$T$=Temperature of the gas.

$U$=Velocity of the neutral gas or vapor.

$U'$=Velocity of the charged particles. In general $U'<U$ owing to the repulsion exerted by the electric counterfield gradient.

$V$=Electric potential at a distance $x$, at section A. By definition; $V=0$, at $x=0$.

$V_s$=potential difference causing sparking in gases.

$X$=electric intensity, or the counterfield gradient against which the gas must do work in increasing the electric potential of the charged particles, at section A.

$x$=distance along the nozzle between sections $A_1$ and A.

$\alpha$≡The ratio of the relative velocity of the ions or charged particles with respect to the gas, to the total velocity of the gas, at the section A, or $(U-U')/U$.

$\phi$=apex angle of the cone of the nozzle.

$\gamma$=The fraction of the total kinetic power in the gas stream, which is converted to electric power in the nozzle.

$\gamma_c$=The critical maximum proportion of kinetic power that can be converted into electrical power, in the nozzle; that is:

$$\gamma_c \equiv \frac{P_f}{P_m} \qquad (1)$$

$\delta$=The average mass density of the gas stream, including suspended particles, if any.

$\delta_0$=The average mass density of the gas stream, excluding the suspended particles, if any; $\delta_0'$ same, at S. T. P.

$\delta_c$=Critical gas density necessary to avoid flashback.

$\rho$=Electric charge density at section A.

$\epsilon_0$=Dielectric constant of free space=$8.85\times10^{-12}$ in the m. k. s. system.

$\Gamma=\mathcal{D}/\delta_c$.

In carrying out this derivation, it will be understood that:

I. The gas stream has an initial velocity $U_1$, imparted to it, for example, by an expansion of the gas in a nozzle from a condition of input of high heat content $H_0$, to a condition of output of low heat content, $H_1$, prior to entering section $A_1$. The difference in this flow of the heat contents is converted into kinetic power; thus:

$$P_m=\frac{1}{2}MU_1^2=J(H_0-H_1) \qquad (2)$$

II. Substantially no thermodynamic change occurs along the nozzle from $x=0$ to $x=L$ in the conversion space; that is, pressure, temperature, volume and heat content remain substantially constant.

To accomplish this purpose, the nozzle area, A, is increased at a rate approximately inversely proportional to the decreasing velocity U. That is, approximately:

$$AU\equiv\text{Constant} \qquad (3)$$

In this manner mass flow M, gas density, $\delta_0$, and temperature T of the gaseous medium can be maintained substantially constant across all sections. To correct for variations in Equation 3 due to small frictional losses which act to increase the heat content of the gas, it may be necessary to make the area somewhat larger than calculated according to (3). The drop in kinetic power, produced by the reduction in the mass velocity, U, as A is increased, is converted to electric power, as hereinafter described.

In another embodiment of this invention the area A may be increased in greater than inverse proportion to the decrease in the velocity. In this case further thermodynamic change will occur in the conversion space; that is, gas density and temperature will drop during the increase in electric potential energy of the charged particles; and the thermodynamic energy will be converted simultaneously to electric energy. However, although within the purview of this invention, this case will not be treated mathematically herein.

III. The frictional power losses are held to a small fraction of converted power. This is done by employing an ion or aerosol particle having a sufficiently low mobility to minimize slip. This result is obtained by using a charged particle of sufficiently large diameter. In this manner the relative velocity of ion and gas stream, due to slip, is minimized; and thus the frictional power losses due to such slip velocity are kept small relative to the generated electric power.

IV. The meter-kilogram-second system of units will be used.

*Mathematical-physical analysis*

Let there be a stream of gas containing ions of one sign comprising an aerosol containing charged particles, in which there is substantially no slip, or relative motion, between the ions or charged particles and the gas stream. The condition for this is for the mobility $k$ to be very small.

The total current L is given by:

$$I=neAU \qquad (4)$$

The current I is constant across all cross-sectional areas A of the conversion space during equilibrium operating conditions.

Under conditions of operation in which the slip factor $\alpha$ is equal to or less than .01, the velocity U in Equation 4 may be taken as the same for both the gas, and the charged aerosol particle entrained thereby.

During any increment of length, $dx$, the kinetic energy converted into electric energy, per unit of time, is given by:

$$\frac{-d}{dx}(\tfrac{1}{2}MU^2).dx=\frac{M}{2}2U\frac{dU\,dx}{dx}=-MU.dU \qquad (5)$$

The electrical energy developed per unit of time, or electric power conversion in the increment of length $dx$ is given by:

$$IX.dx=-MU.dU \qquad (6)$$

The charge density, $\rho$, is given by:

$$\rho=\frac{I}{AU} \quad (7)$$

Since AU is constant, by (3), and since I is constant, it follows that the charge density, $\rho$, is also constant.

Next, the potential distribution due to the space charge and the superimposed load voltage E will be calculated, using Poisson's equation, as follows:

$$\frac{\partial^2 V}{\partial x^2}=-\frac{\rho}{\epsilon_0}=-a \quad (8)$$

Integrating this, the counterfield electric intensity X is given by:

$$X=\frac{\partial V}{\partial x}=-ax+C_1 \quad (9)$$

Integrating again the potential distribution is given by the following:

$$V=-a\frac{X^2}{2}+C_1x+C_2 \quad (10)$$

The constants of integration, $C_1$ and $C_2$, are now evaluated subject to the following conditions:

$$V=0,\ x=0$$

and $$V=E,\ x=L \quad (11)$$

From this there is obtained:

$$C_2=0 \text{ and } C_1=\frac{E}{L}+\frac{aL}{2} \quad (12)$$

Hence;

$$V=\frac{Ex}{L}+\frac{aL^2}{2}\left(\frac{x}{L}-\frac{X^2}{L^2}\right) \quad (13)$$

Differentiating (13) to obtain the electric intensity X, there is obtained:

$$X=\frac{V}{x}=\frac{E}{L}+\frac{aL}{2}\left(1-\frac{2x}{L}\right) \quad (14)$$

From (14) it is apparent that the electric intensity is a maximum when $x=0$, and that X decreases linearly to $x=L$. When $x=L$, and in the region immediately preceding L it is essential that the values of X do not become negative. If X were permitted to become negative then the electric energy would be converted back again into kinetic energy thereby causing the velocity of the gas stream to increase again, causing a reduction in the overall conversion efficiency. Hence, there is a critical value of X, such that $X=0$, at $x=L$. Making use of this relation, and putting $X=0$ at $x=L$ into (14), there is now obtained an expression for the electric intensity along a converter space, under the desired condition of operation, as follows:

if $X=0$ when $x=L$ $$0=\frac{E}{L}+\frac{aL}{2}\left(1-\frac{2L}{L}\right) \quad (15)$$

Putting $a=\rho/\epsilon_0$, from (8) and (15) there is obtained:

$$E=\frac{aL^2}{2}=\frac{IL^2}{2AU\epsilon_0} \quad (16)$$

The electric intensity, along the conversion space is then determined by substituting (16) into (14) with the following result:

$$X=\frac{IL}{AU\epsilon_0}\left(1-\frac{x}{L}\right) \quad (17)$$

The maximum electric intensity occurs when $x=0$, and the corresponding value of electric intensity $X_0$ is given by:

$$X_0=\frac{IL}{AU_1\epsilon_0} \quad (18)$$

The total electric power converted from kinetic power is given by $$P=EI=\frac{IL}{2\epsilon_0 AU_1}\cdot I=I^2L/2\epsilon_0 AU_1 \quad (19)$$

In terms of power density and current density, dividing (19) through by A, there is obtained:

$$p=\frac{P}{A}=\frac{I^2}{A^2}\frac{L^2}{2\epsilon_0 U_1}=\frac{i^2L^2}{2\epsilon_0 U_1} \quad (20)$$

Solving (20) for $i$:

$$i=\sqrt{2\epsilon_0}\sqrt{pU_1}/L=4.22\times10^{-6}\frac{\sqrt{pU_1}}{L} \quad (21)$$

Evaluating E from (21), and:

$$E=\frac{p}{i} \quad (22)$$

$$E=\frac{1}{\sqrt{2\epsilon_0}}L\sqrt{\frac{p}{U_1}}=2.37\times10^5L\sqrt{\frac{p}{U_1}} \quad (23)$$

It will be understood that $p$, and $i$, are values taken at a particular nozzle section, such as the area $A_1$, at the nozzle throat, and E is the potential difference across the entire length L of the conversion space.

In Fig. 12, there is plotted on a log-log scale, power density in watts per square meter as ordinates versus velocity in meters per second, as abscissae, for various values of $E/L$ from Equation 23. There is also plotted on the same scale several additional families of curves, one family of curves being for various values of $iL$ from Equation 21; another family of curves for $E/L$ from Equation 23; etc.

The mass flow, per unit area, is given by:

$$\frac{M}{A}=\delta U \quad (24)$$

The kinetic power density which is converted into electrical power density, is given the following, upon making the substitution from 24:

$$p=\gamma\frac{1}{2}\frac{M}{A}U_1^2=\frac{\gamma\delta}{2}U_1^3 \quad (25)$$

CRITICAL OPERATING CONDITIONS

1. Limitations Due to Electric Flashback

*(a) Critical gas density* $\delta_c$

The critical values of $\gamma_c$ and $\delta_c$, are those values that determine the maximum fraction of kinetic power converted to electric power, without exceeding the breakdown potential of the gas, and thereby causing flashback or a short-circuiting electric discharge within the conversion space.

It is now required to determine the conditions imposed by the necessity to avoid "flashbacks" within the gas stream.

Empirically it has been determined that the sparking voltage $V_s$ is that potential difference required to just cause a spark breakdown through a gas of density $\delta_0$, with the electrode distance L, given approximately by:

$$V_s=b\delta_0 L \quad (26)$$

This relation holds true only above certain values of L. As an example, experimental data with air or nitrogen as a working medium are plotted in the graph on Figure 10. The data are plotted with the ordinates as $V_s$, the minimum sparking voltage, and with the abscissae as the product $\delta_0 L$. The equation for the curve experimentally obtained is given approximately by:

$$V_s - 3000 = 2.50\times10^6\delta_0 L \text{ (m. k. s.)} \qquad (27)$$

NOTE.—On rechecking calculations, the value of $b$ for air is $2.25\times10^6$. This will effect subsequent calculation by 10% but will not alter the order of magnitude of the results; $b=2.50\times10^6$ applies to slightly inhibited or impure air.

In general terms the above may be expressed:

$$V_s = C + b\delta_0 L \qquad (28)$$

Where $C=3000$ and $b=2.50\times10^6$ (27)

Putting $V_s=E$ and dividing through (28) by L there is obtained the following:

$$\frac{E}{L} = \frac{C}{L} + b\delta_0 \qquad (29)$$

From (23) and (29) there is obtained:

$$\frac{1}{\sqrt{2\epsilon_0}}\sqrt{\frac{p}{U_1}} = \frac{C}{L} + b\delta_0 \qquad (30)$$

Making the substitution from (25) into Equation 30 there is obtained the following:

$$\frac{1}{\sqrt{2\epsilon_0}}U_1\sqrt{\frac{\gamma\delta}{2}} = \frac{C}{L} + b\delta_0 \qquad (31)$$

The condition for the approximation (26) to hold is given by the following inequality:

The double inequality sign indicates that the larger quantity is greater than the smaller quantity by a factor of the order of ten or more $$b\delta_0 \gg \frac{C}{L};\ \delta_0 \gg \frac{C}{bL} \qquad (32)$$

Putting the numerical values for $b$ and $C$ from Equation 27 into the inequality (32) and utilizing a value of L of the order of $10^{-2}$ meters, the minimum value of for which (26) is in error by less than 10%, may be computed as follows:

$$\delta_0 = 10\frac{C}{bL} = \frac{10\times3000}{2.5\times10^6\times10^{-2}} = 1.20 \text{ kg./m.}^3 \qquad (33)$$

For comparison, the density of air at S. T. P.=1.293 kg,/m.³. Hence if a gas density, in excess of the value given in (33), is utilized, approximation (26) may be used and the term $C/L$ in Equation 31 may be neglected.

It is further assumed that $\delta=\delta_0$; that is, the aerosol particles do not substantially increase the gas density. $\delta=\delta_0$ is now changed to $\delta_c$ to indicate it is a critical gas density. This assumption will later be shown to be justified by a calculation which shows that the total mass of the aerosol particles must be of the order of 0.03% to 30% of the mass of the gas in which they are entrained, assuming only one electron charge per aerosol particle, under typical operating conditions.

Under these circumstances, solving (31) for $\delta_c$: when $$\delta_c \gg \frac{C}{bL};\ \delta_c = \frac{1}{4b^2\epsilon_0}\gamma_c U_1^2 \qquad (34)$$

Substituting the value for $\delta=\delta_c$ from (25) into (34) and solving for the critical gas density $\delta_c$, there is finally obtained an expression relating $\delta_c$ to the electric power density $p$ and the velocity $U_1$; thus $$\delta_c = \frac{1}{b\sqrt{2\epsilon_0}}\sqrt{\frac{p}{U_1}} \qquad (35)$$

For the particular experimental data for air or nitrogen the Equation 35 may be evaluated with the following results:

$$\delta_c = \sqrt{\frac{p}{110\,U_1}} \qquad (36)$$

The Equation 35 is plotted, for various values of $\delta_c$ greater than that given by (34), on Fig. 12.

*(b) Power conversion factor*

To determine the proportion of kinetic power it is possible to convert into electrical power in a nozzle, solve Equation 25 for $\gamma$, putting $\gamma=\gamma_c$ and $\delta=\delta_c$, and substitute the value of $\delta_c$ from (35) therein. From this is obtained:

$$\gamma_c = b\sqrt{8\epsilon_0}\sqrt{\frac{p}{U_1^5}} \qquad (37)$$

Putting in the values of $b$, for air or nitrogen, and $\epsilon_0$, there is obtained $$\gamma_c = 21.0\sqrt{\frac{p}{U_1^5}} \qquad (38)$$

Figures 10, 11:
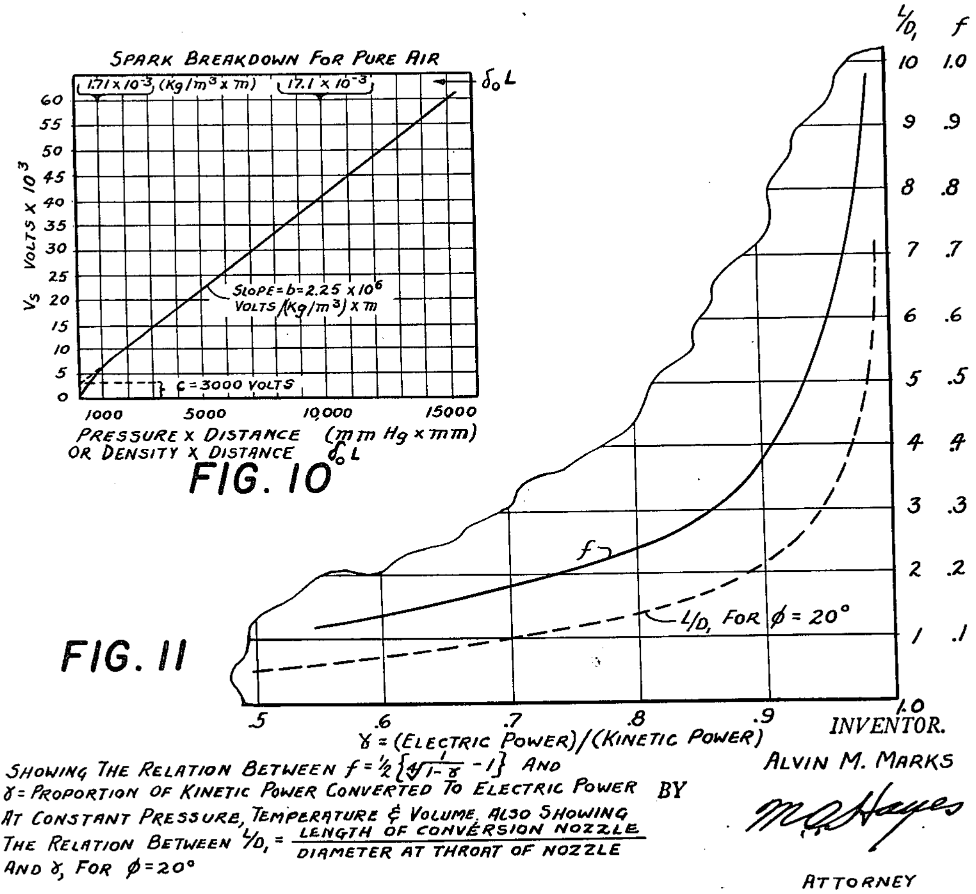
Fig. 10 is a graph of accepted experimental values of breakdown voltage—plotted against pressure times distance between gap electrodes.
Fig. 11 is a graph of a relationship between nozzle dimensions and kinetic-to-electric power conversion.

From Equation 37 it will be seen that for a given kinetic power density and a given gas velocity, the greater the value of $b$, that is: the greater the slope of $V_s$, $\delta_0 L$ graph in Fig. 10, the greater the proportion of the kinetic power density there can be converted into electrical power.

It is a feature of this invention to employ means for increasing the value of $b$, as for example the introduction of spark inhibitors such as Freon, carbon tetrachloride, or chlorine, into the gas stream. However, in Fig. 12, a plot of Equation 38 for various values of $\gamma_c$ is shown, for the value of $b$, given above, for nitrogen or air. Also, another scale is shown for a value of $b$ ten times the value given for air.

In order to summarize all the pertinent data Fig. 12 has been constructed with the ordinates plotted as a log of the electric power density, $p$, and the abscissae plotted as the log of the velocity of gas flow $U_1$. On this log-log graph the following equations have been plotted: Equation 21 for various values of the product $iL$; Equation 23 for various values of the average electric intensity $E/L$; Equation 35 for various values of the critical gas density $\delta_c$; and, Equation 37 for various values of the power conversion factor $\gamma_c$. In this manner there may be quickly determined for any given value of "converted power density," and "power conversion factor," values of "current density" and "potential difference" built up across a nozzle of given length. In addition to this, critical gas density $\delta_c$, and mobility reduced to STP, $K_0$, are also shown.

*(c) Effect of spark inhibitors*

In general, the use of spark inhibitors, such as Freon, prevents the formation of ions, in the ionization stage. Accordingly, I prefer to separate the "ionization stage" and the "conversion stage," utilizing a readily ionizable gas in the ionization stage. After the ions are formed the ionizable gas, with the ions contained therein, are mixed with the aerosol gas containing the spark inhibitor. The aerosol particles pick up the ions and become charged, and the conversion from kinetic to electric power then proceeds in a gas with a higher dielectric breakdown strength.

The effect of increasing the dielectric breakdown strength of the gas is to increase the slope $b$ of the curve shown in Fig. 10. Gases that can be employed for this purpose include Freon, carbon tetrachloride, chlorine, alone or mixed with air for example. The value of $b$ can in this way be increased by a factor of 10 to 20 times over that of pure air. The aforementioned gases have the property of electron attachment, so that free electrons are rapidly captured, thus inhibiting "electron avalanches" or sparks.

A very important feature of this invention is the utilization of aerosol containing gases or vapors that have a higher dielectric strength, or an increased value of $b$, over that of air.

Inspection of Fig. 12 will illustrate the effects of increasing $b$. Taking given values for power density $p$, nozzle length L, and conversion efficiency $\gamma$; then, increasing $b$, we obtain: increased current density, lower voltage, lower gas density, increased gas velocity. Also, the aerosol particle size is increased somewhat. See Example 2, hereinafter.

The extremely short length of nozzle is another very important feature of this invention. The short nozzle enables a relatively low voltage to be generated, and overcomes the current-density limiting effects of space charge encountered with the long nozzles previously employed. The array of short nozzles permits an unlimited total cross-sectional area of nozzle to be obtained.

Thus, a high current, relatively low voltage generator can be constructed according to the principles, operating under the physical conditions of the order of magnitude set forth in Fig. 12, and the accompanying equations.

To explicitly determine the way in which $E/L$, $iL$, and $p$ are determined by the chosen values of $b$ and $\gamma_c$, the following equations are derived.

From Equations 23 and 37, eliminating $p$, it follows that:

$$\frac{E}{L}=\frac{\gamma_c}{4\epsilon_0 b}U_1^2 \tag{39}$$

From Equations 21 and 37, eliminating $p$, it follows that:

$$iL=\frac{\gamma_c}{2b}U_1^3 \tag{40}$$

From (39) and (40) and $$p=\frac{E}{L}\cdot iL=Ei$$

$$p=\frac{1}{8\epsilon_0}\left(\frac{\gamma_c}{b}\right)^2 U_1^5 \tag{41}$$

In the following examples, the power densities and current densities should be divided by a factor of about 4 to obtain the actual outputs per square meter. This reduction factor is applied to the closely packed nozzles in the nozzle plate, since this is approximately the ratio of the total area of the nozzle plate, to the total area of all the nozzles, taken at their throat, or section of minimum area.

It will be noted that the values calculated in the examples check the curves shown in Fig. 12, which is useful to show all the relationships at a glance. It is recommended, however, that the equations, herein above developed, be used for the most precise determination of calculated values.

Example I

*Constant velocity*

Let $\gamma_c=.885$ $U_1=50$ meters/sec.

$L=5\times10^{-3}$ meters (5 mm.)

$\alpha=.01$ $\eta=2.50\times10^{-5}$

TABLE 1

[Example of voltage—Current power for a "pure" air and an "inhibited" aerosol.]

| From Equ. | Symbol | Units | "Pure" aerosol $b=2.50\times10^6$ | "inhibited" Aerosol $b=2.50\times10^7$ |
|---|---|---|---|---|
| (39) | E | Volts² | 125,000 | 12,500 |
| (40) | $i$ | amp./m. | 4.43 | 0.443 |
| (41) | $p$ | watts/m. | 555,000 | 5,550 |
| (35) [1] | $\delta_c$ | kg./m.³ | 10 | 0.1 |
| (55) | $a_0$ | meters | $1.27\times10^{-8}$ | $4\times10^{-8}$ |

[1] NOTE.—at S. T. P. $\delta_0$ = 1.293 kg./m.³.

Example II

*Constant power density*

Let $\gamma_c=0.9$ $p=10^4$ watts/in.²

$L=5\times10^{-3}$ meters

TABLE 2

| From Equ. | Symbol | Units | "Pure" aerosol $b=2.50\times10^6$ | "inhibited" aerosol $b=2.50\times10^7$ |
|---|---|---|---|---|
| (41) | $U_1$ | meters/sec. | 22.2 | 55.3 |
| (40) | $i$ | amps./m.² | 0.397 | 0.632 |
| (39) | E | volts | 25,200 | 15,800 |
| (35) | $\delta_c$ | Kg./m.³ | 2.0 | 0.129 |
| (55) | $a_0$ | meters | $1.9\times10^{-8}$ | $3.8\times10^{-8}$ |

From this it will be seen that a constant power density, the "inhibited" aerosol results in a considerably lower voltage, and higher current density. This accompanied by increasing the velocity and decreasing the gas density, to keep the kinetic power input constant. Slightly larger particle size is required.

Example III

*Constant critical gas density (at standard temperature and pressure)*

$\delta_c=1.30$ kg./m.³ (S. T. P. $\delta_0=1.293$)

$\gamma_c=0.90$ $L=2\times10^{-3}$ meters (2 mm.)

TABLE 3

| From Equ. | Symbol | Units | Aerosol "Pure" Air =2.50×10⁶ | Aerosol "Inhibited" =2.50×10⁷ |
|---|---|---|---|---|
| (34) | $U_1$ | meters/sec. | 18.1 | 181 |
| (39) | E | volts | 6660 | 66,600 |
| (40) | $i$ | amps./m.² | 0.5 | 50. |
| (41) | $p$ | watts/m.² | 3,300 | 3,300,000 |
| (55) | $a_0$ | meters | $2.1\times10^{-8}$ | $2.1\times10^{-8}$ |

Comparison of the last two columns shows the very large current density and power output obtainable with the "inhibited" aerosol compared to the "pure" air aerosol.

This important result permits the compact design of high output generators.

2. The Charged Particle

(a) *Limiting maximum particle mobility values for efficient operation*

It is next required to determine the value of the mobility $k$ of an ion, or charged particle, required to reduce the slip factor $\alpha$, to some predetermined value, such that, the energy lost in the viscous motion of the ion, or charged particle, relative to the gas will be maintained at a comparatively negligible value. By definition:

$$\alpha \equiv \frac{U-U'}{U} \equiv \frac{kX}{U} \quad (42)$$

Where $\alpha$ represents the fraction of power lost to random gas motion caused by the viscous motion of the ion, or charged particle through the gas. This may be readily seen by multiplying the numerator and denominator of (42) by F, which is the force exerted by the gas in moving the ion or charged particle against the counterfield at the velocity U; FU being thus the kinetic power converted into electrical power in the form of time rate of increase of the potential energy of the ion or charged particles plus the fraction of the kinetic power of the gas stream which is converted to random heat motion within the gas, or, frictional power. The ion or charged particle must exert an equal and opposite force, F, which force is expended as a power loss of viscous motion relative to the gas stream at a velocity (U−U'): consequently, the frictional power is given by: $F(U-U')$. This may be expressed as follows:

$$\alpha \equiv \frac{F(U-U')}{FU} = \frac{\text{Frictional Power Loss}}{\text{Total Kinetic Power}} \quad (43)$$

Substituting the value of $$X = \frac{E}{L}$$

from (23) into (42) and solving for $k$:

$$k = \sqrt{2\epsilon_0}\alpha U^{3/2} p^{-1/2} \quad (44)$$

Generally speaking it will be desired to have a value of $\alpha$ less than 0.01. Smaller values of $\alpha$ are not of practical concern. Hence upon substitution of values for U and $p$ in (44) and upon choosing a value of $\alpha$ equal to 0.01 the value of $k$ thus obtained may be termed $k_{max}$, or the limiting maximum value of mobility, for the given velocity and power conditions for efficient conversion of kinetic to electric power.

The following empirical equation for the mobility of a charged particle is from Milliken's work on charged oil droplets.

$$k = \frac{Ne}{6\pi\eta a_0}\left(1 + 0.873\,\frac{l}{a_0}\right) \quad (45)$$

According to the kinetic theory of gases, the relation between mean free path and gas density is $$l = l'\frac{\delta_0'}{\delta_0} \quad (46)$$

Substituting the value of $l$ from (46) into (45) the following equation is obtained $$k = \frac{C''}{a_0}\left(1 + \frac{C'}{\delta_0 a_0}\right) \quad (47)$$

where $$C'' = \frac{Ne}{6\pi\eta} \quad \text{and} \quad C' = 0.873\,\delta_0' l' \quad (48)$$

In the following table values of C' are computed for various gases from values given in the literature:

TABLE 4

| Gas | $\delta_0' l'$ | $C'$ |
|---|---|---|
| Air | $1.095\times10^{-7}$ | $9.57\times10^{-8}$ |
| Carbon Dioxide | $1.082\times10^{-7}$ | $9.45\times10^{-8}$ |
| Hydrogen | $1.42\times10^{-8}$ | $1.24\times10^{-8}$ |
| Nitrogen | $1.05\times10^{-7}$ | $9.18\times10^{-8}$ |
| Oxygen | $1.275\times10^{-7}$ | $11.12\times10^{-8}$ |

In Equation 47 when the following condition obtains $$\frac{C'}{\delta_0 a_0} \gg 1 \quad (49)$$

Then Equation 47 may be written:

$$k = \frac{C'C''}{\delta_0 a_0^2} \quad (50)$$

Also:

$$K_0 = \frac{C'C''}{\delta_0' a_0^2} \quad (51)$$

Under these conditions the mobility $k$ at the gas density $\delta_0$ may be reduced to the value of $K_0$, which is the mobility of the same particle of radius $a_0$, in the same gas, at temperature 273° K. and one atmosphere pressure. Upon taking the same value for $$\frac{C'C''}{a_0^2}$$

in (50), and (51) dividing (50) by (51), and solving for $k$:

$$k = K_0\frac{\delta_0'}{\delta_0} \quad (52)$$

$k$ and $\delta_0$ are next eliminated, by substituting the value of $\delta_0$ from (35) into Equation 52 and equating the resulting expression to the value of $k$ determined by Equation 44. From this, a solution results giving the value of $K_0$:

$$K_0 = \frac{\alpha}{b\delta_0'}U \quad (53)$$

Putting the following values, for air, into (53):

$\alpha = 0.01$; $b = 2.50\times10^6$ and $\delta_0' = 1.29$ the following evaluation of (53) is obtained:

$$K_0 = 3.11\times10^{-9}U \quad (54)$$

For example, a typical gas-flow velocity of 100 meters per second may be chosen; and putting this value into Equation 54 there is obtained a mobility of $3.11\times10^{-7}$ meters per second/volt per meter. This is the order of mobility observed for the so-called Langevin ion, formed from water vapor. Other ions or charged particles in this range have been observed with hydrocarbon mist, phosphorus smoke, zinc or zinc oxide clouds, ammonium chloride clouds, mercury clouds and cadmium oxide clouds. In general, aerosol particles usually have a mobility of this order, or, what is most desirable for reduction of frictional power loss, still lower mobility values. The values of mobility, herein calculated, may be considered the upper limit in the mobility of the particle, requisite to the achievement of low relative slip or frictional power loss.

(b) *Minimum particle radius for efficient operation*

To determine the minimum particle radius, $a_0$, required to achieve a mobility $K_0$ not exceeding that value given by Equation 54; Equations 51 and 53 are equated and solved for $a_0$, with the following result:

$$a_0 = \left(C'C''\frac{b}{U\alpha}\right)^{1/2} \quad (55)$$

The order of magnitude of $a_0$ may now readily be obtained by substituting values for air, as follows:

From (48)

$$C'' = \frac{Ne}{6\pi\eta} = \frac{1\times1.600\times10^{-19}}{6\pi\times2.5\times10^{-5}} = 3.41\times10^{-16} \quad (56)$$

The value of viscosity chosen for the above calculation is given for air at 450° K.; and the value for $C^1$ may be found in Table No. 4 as $9.57\times10^{-8}$.

The values of minimum particle radius, $a_0$, for efficient operation, $\gamma_c=0.9$, have been computed and are given in the listing under Examples I, II, III. It will be noted that $a_0$ varies very little under the various operating conditions assumed, from $a_0=1.27\times10^{-8}$ to $a_0=4\times10^{-8}$. Of course, the larger value may be used in all the examples given, without appreciably affecting the results.

In considering the minimum value of particle radius, $a_0$, that may be employed under certain conditions of operation, it will be helpful to select the largest values of U, $\eta$, and the smallest values of N and $b$ which are likely to be used; and then calculate the smallest value of $a_0$ from (55).

The factor C'' is inversely proportional to the viscosity $\eta$. The viscosity $\eta$, in general, increases with the temperature and therefore higher temperatures favor smaller values of C''. Equation 52 can be modified, in view of (45), to take into account the temperature variation of viscosity:

$$k=K_0\frac{\delta_0'\eta'}{\delta_0\eta} \qquad (57)$$

With respect to the viscosity coefficient, physical data giving the range of variation for $\eta$ shows, for example, that water vapor at 270° K. has a viscosity of $0.8\times10^{-5}$ m. k. s. units of viscosity, and at 650° K.: $2.5\times10^{-5}$; while, for mercury vapor the viscosity at 650° K. is $2.50\times10^{-5}$, at 510°: $4.50\times10^{-5}$, and at 750° K.: $8\times10^{-5}$. The latter is the largest value of $\eta$ that is likely, and in any case, the range of variation is about 10/1.

Equation 45, which is the basis for the derivation leading to Equation 55 and the numerical results therefrom, has been shown not to apply below radii of less than $6\times10^{-10}$ meters. Fortunately, the present analysis leads to a particle radius well above the lowest range of applicability of Equation 45.

Because of the disadvantages of using a value of $b$ less than that of air, let us take $b=2.50\times10^{6}$ as the lowest value of $b$; let us take the largest value of $\eta=8\times10^{-5}$; and use the lowest value of $C^1=1.24\times10^{-8}$; for hydrogen. The largest value of U that can be used, in Fig. 12, with $v_c=0.9$ is about 100 m./sec. Putting these miscellaneous limiting physical values into (55) we obtain a lower limit for particle radius:

$$\text{least } a_0=\left(\frac{1.24\times10^{-8}\times1.05\times10^{-16}\times2.50\times10^{6}}{10^{2}\times10^{-2}}\right)^{\frac{1}{2}}= 1.8\times10^{-9}\text{ meters}$$

*(c) Optimum particle radius*

It will be shown hereinafter that, for a given mass of earosol particles per unit volume of gas, the smaller the particle radius, and hence the greater the number of particles, there may be obtained a greater electric charge per unit volume of aerosol. This being so, then, it will be preferred to use the minimum particle radius permissible for efficient operation, as defined by Equation 55, which consequently also defines the optimum particle radius.

*(d) The ratio of solid liquid particle density to gas density*

The mass of solid or liquid particles per unit volume of as is given by:

$$\mathscr{D}=n\cdot\frac{4}{3}\pi a_0^3\delta_p=\frac{i}{ev}\cdot\frac{4}{3}\pi a_0^3.\delta_p \qquad (57.1)$$

In (57.1) the value for $n$ was obtained from (4), and N is taken equal to 1.

Substituting for $i$ from (40), dividing through and $\delta_c$ from (35), and simplifying there is obtained the ratio:

$$\Gamma=\frac{\mathscr{D}}{\delta_c}=\frac{8\pi\epsilon_0}{3e}\cdot\frac{b}{L}\delta_p a_0^3 \qquad (57.2)$$

Evaluating the constant terms:

$$\Gamma=4.63\times10^{8}\frac{b}{L}\delta_p a_0^3 \qquad (57.3)$$

In the following Table 5, the value of $\Gamma$ is computed for the various conditions previously set forth in Examples I, II, III.

TABLE 5

$\alpha=0.01$ $\delta_p$=density of the solid or liquid particle is assumed as 2000 Kg./m.$^3$ or (2 gm./cm.$^3$)

| Example | $b$ | L | $a_0$ | $\Gamma$ |
|---|---|---|---|---|
| I | $2.50\times10^{6}$ | $5\times10^{-3}$ | $1.27\times10^{-8}$ | 0.00095 |
| I | $2.50\times10^{7}$ | $5\times10^{-3}$ | $4\times10^{-8}$ | 0.298 |
| II | $2.50\times10^{6}$ | $5\times10^{-3}$ | $1.9\times10^{-8}$ | 0.00318 |
| II | $2.50\times10^{7}$ | $5\times10^{-3}$ | $3.8\times10^{-8}$ | 0.254 |
| III | $2.50\times10^{6}$ | $2\times10^{-3}$ | $2.1\times10^{-8}$ | 0.0104 |
| III | $2.50\times10^{7}$ | $2\times10^{-3}$ | $2.1\times10^{-8}$ | 0.104 |

Thus, the aerosol solid or liquid particle mass per unit volume may vary from about 0.1 to 30% of the gas density.

Referring to Equation 57.2 it will be noted that $\Gamma$ depends only on the factors $b$, L, $a_0^3$, $\delta_p$ and that all other variables, such as $i$, E. U. etc. are automatically accounted for when these factors are chosen. The value of $\Gamma$ must be less than 0.10, however, for the assumption $\delta_0=\delta=\delta_c$, upon which the derivations herein are made, to be reasonably accurate. This does not mean that devices in which $\Gamma>0.10$ will not be operable, but, that corrections must be made, in such case, to the equations previously derived, so that accurate computations may be made with $\Gamma>0.10$.

In this connection, consideration of Equation 57.2 shows that, other things being constant, the magnitude of $\Gamma$ is most affected by variations in particle radius; that is $\Gamma$ varies as $a_0^3$. But, Equation 55 shows that $a_0$ varies inversely as the square root of $\alpha$, the slip factor. Hence, $$\Gamma\alpha\frac{1}{\alpha^{3/2}} \qquad (57.4)$$

so that by increasing $\alpha$ from .01, which was assumed in all previous calculations, to .04 the magnitude of $\Gamma$ in all the calculations of Table 5 is reduced by a factor of 8. Thus, when the slip is 4%, $\Gamma$ in Table 5 does not exceed .032 or 3.2%, and all the equations heretofore derived apply, to a good approximation. Moreover, the efficiency of conversion of kinetic to electric power is not materially reduced.

*(e) Ionization of the aerosol particles*

The above discussion has assumed an average of 1 electron charge per aerosol particle.

According to M. Pauthenier "The Theory of the Electric Charge of Dust Particles and High Voltage Gaseous Current Generators" in Revue Generale De L'Electricite, May 6, 1939, pp. 583-595, the charge limit of spherical particles varies approximately as the square of the radius. For $a_0=10^{-5}$ meters and with an impressed field of $1.8\times10^{6}$ volts/meter, $Q_{max}$ is about 38,000e. Extrapolating to $10^{-7}$ meters $Q_{max}=3.8e$ average. The Pauthenier equations are said to not accurately apply below $10^{-6}$ meters.

However, according to "Fundamental Processes of Electrical Discharge in Gases" by Loeb, p. 149, 1939, Wiley: ions of radius below $10^{-8}$ meters take on charges of the order of a single electron, and the rate of charging is "surprisingly rapid" for ions of the order of $10^{-7}$ meters. Hence, in the above calculations, the chance of an average of one electron charge per particle was indicated. Even if several electron charges per particle are obtained, the order of magnitude of the numerical results will be not essentially changed.

The maximum charge per particle, according to Pauthenier, varies as the square of the particle radius; and the mass per particle varies as the radius cubed. Hence, for a given charge density, coulombs/meter$^3$, the total aerosol mass will vary directly as the particle radius. The conclusion from this is that smaller particle radii, and more particles, with one or several electron charges per particle, will result in a minimum aerosol mass required to carry a given charge density within the gas mass.

Hence, in the present invention, it is preferred to use particles of such radius (say 2 to $8\times10^{-8}$ meters) as to fulfill the latter condition, with the slip factor $\alpha$ not exceeding about 0.04.

(e) *Nature of the particles*

Various chemical smokes and clouds which may be employed in this invention have been disclosed, and the type employed depends on the design of the generator. In generators employing negatively charged particles, it may be desired to employ electron-binding materials to comprise the particles. For example, diphenyl chloride (commercially known as "Aroclor") mist may be utilized as an electron-binding material. Other known materials have, in a similar way, a tendency to remain positively charged, and thus tend to lose an electron, and are thus more suitable for use as positively charged particles.

In general, materials of high dielectric constant, or metallic particles, are preferred since these have a greater charge-binding capacity in the ratio $$3\frac{\epsilon-1}{\epsilon+1}$$

$\epsilon$ being the dielectric constant of the material relative to free space; and $\epsilon=\infty$ for metals.

3. The Nozzle and the Nozzle Plate

Figs. 1, 2, 3 and 7, are views of the nozzle, and the arrays of nozzles in the nozzle plates.

The nozzles are set side by side and spaced as closely as possible. The total cross-sectional area of all the nozzles, taken at their throats, may be related to the total plate area, by a "packing" factor $f_0$.

The electric power density, $p$, of each nozzle, and the packing factor, $f_0$ may then be used to determine the average electric power density $p'$ of the nozzle plate, thus:

$$p'=f_0p \qquad (58)$$

It will be seen hereinafter that the initial and final diameters of the nozzle, $D_1$, and $D_2$, and the length thereof, L, is related to the fraction, $\gamma$, of the kinetic power converted to electric power.

Given, the nozzle throat power density, $p$; $\gamma$, and $\phi$, the nozzle dimensions $D_1$, $D_2$ and L, may be computed. As may be seen from Fig. 12, $p$ and $\gamma$ uniquely determine $$\frac{E}{L}$$

and $iL$, so that given L, the voltage, E, and current density, $i$, at the nozzle throat, are also then determined.

The relation between $\gamma$, L and $D_1$, will now be found under the condition of no thermodynamic change on the conversion space; that is $AU$=constant. Referring to Fig. 8, it will be seen that:

$$\tan\phi/2=(r_2-r_1)/L \qquad (59)$$

$$r_1=\sqrt{\frac{A_1}{\pi}}\quad r_2=\sqrt{\frac{A_2}{\pi}} \qquad (60)$$

$$\tan\phi/2=\frac{\sqrt{A_2}-\sqrt{A_1}}{\sqrt{\pi}L} \qquad (61)$$

Let $\gamma$=proportion of kinetic power converted to electric power then $$\gamma=\frac{1/2MU_1^2-1/2MU_2^2}{1/2MU_1^2}=1-\left(\frac{U_2}{U_1}\right)^2 \qquad (62)$$

But, since $A_1U_1=A_2U_2$;

$$\gamma=1-\left(\frac{A_1}{A_2}\right)^2 \qquad (63)$$

Hence $$A_2=\frac{A_1}{\sqrt{1-\gamma}} \qquad (64)$$

Putting (64) into (61) and using (60), and $D_1=2r_1$;

$$\tan\phi/2=\frac{D_1}{2L}\left\{\frac{1}{\sqrt[4]{1-\gamma}}-1\right\} \qquad (65)$$

Let $$f=\left\{\frac{1}{\sqrt[4]{1-\gamma}}-1\right\} \qquad (66)$$

Then $$\frac{L}{D_1}=\frac{f}{2\tan\phi/2} \qquad (67)$$

In Fig. 11, Equations 66 and 67 are shown, with $\gamma$ plotted as abscissa; and, $f$, and $L/D_1$, for $\phi=20°$, as ordinates.

Figures 1, 2:
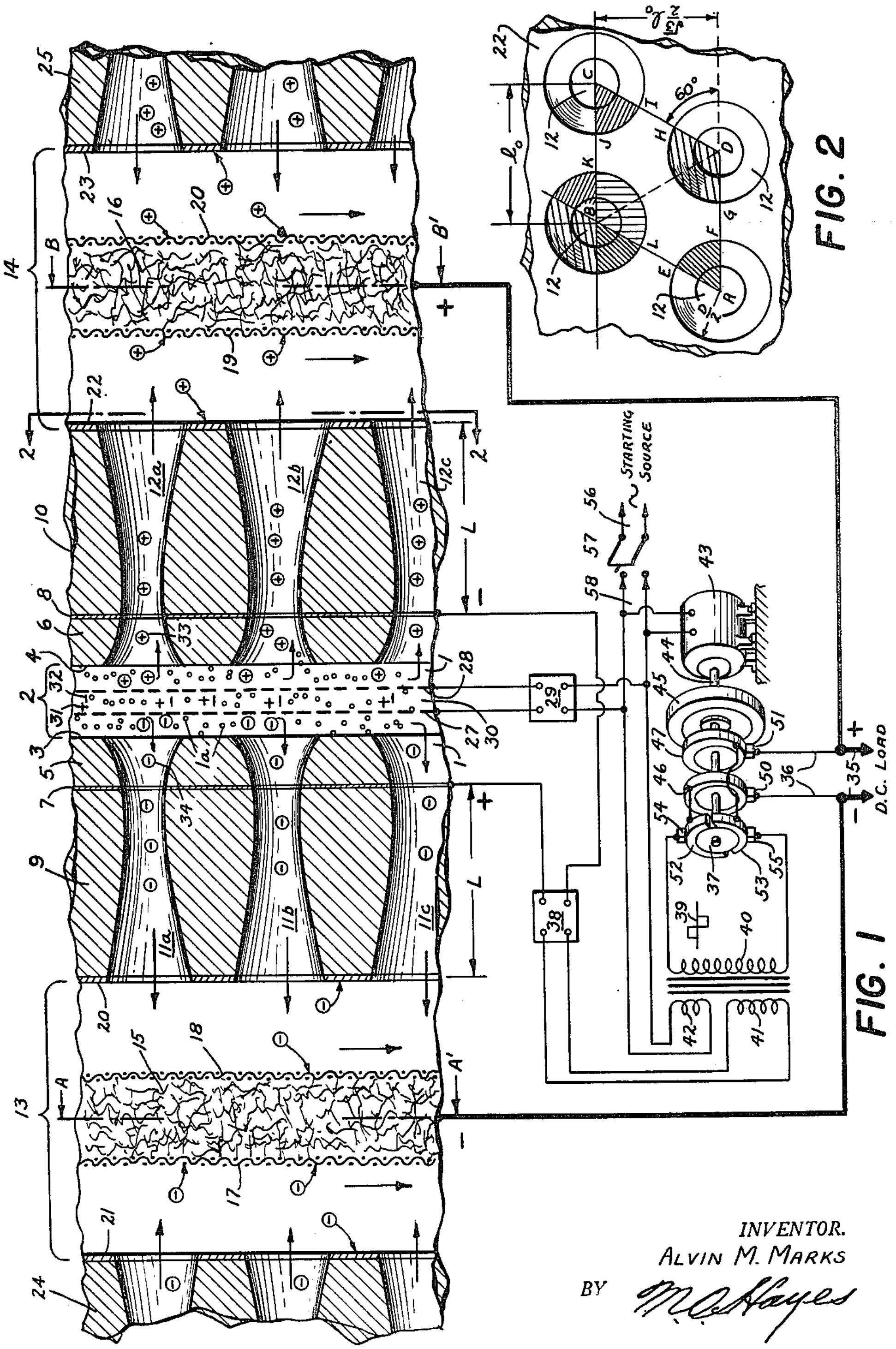
Fig. 1 is a fragmentary, partly diagrammatic cross-section of an ion convection generator showing a preferred embodiment of the invention.
Fig. 2 shows a fragmentary plan view of the nozzle plate.

Fig. 2 is a fragmentary view of the nozzle plate normal to its face 22.

It is now required to determine the packing factor, $f_0$, for the ratio of the throat area of all the nozzles to the total area, allowing enough wall thickness between the largest sections for purposes of strength:

$$\text{Area } ABCD=\frac{\sqrt{3}}{2}l^2$$

Areas ($AEF$ plus $DGH$ plus $CIJ$ plus $BKL$)=

$$A_2=\frac{\pi}{4}D_2^2$$

Hence, every parallelogram such as ABCD cuts segments of four circles, totalling the area of one circle of diameter $D_2$.

Let $$f_1=\frac{\text{Area of all circles of diameter } D_2}{\text{Total area of plate (excluding rim)}}$$

$$f_1=\frac{\pi}{2\sqrt{3}}\left(\frac{D_2}{l}\right)^2 \qquad (68)$$

$$f_0=f_1\frac{A_1}{A_2}=f_1\sqrt{1-\gamma} \qquad (69)$$

$$f_0=\frac{\pi}{2\sqrt{3}}\left(\frac{D_2}{l}\right)^2\sqrt{1-\gamma}=0.910\left(\frac{D_2}{l}\right)^2\sqrt{1-\gamma} \qquad (70)$$

Putting $$\frac{D_2}{1}=.9$$

$$f_0=0.819\sqrt{1-\gamma} \quad (71)$$

and taking $$\gamma=0.9$$

$$f_0=0.258$$

Hence, with $\gamma=0.9$, the relation between the power density, taken at the throat of the nozzle, and the average power density over the entire nozzle plate is given approximately by $$p'=0.258p \quad (72)$$

4. VOLTAGE-CURRENT CHARACTERISTICS

Eliminating U, between Equations 39 and 40, the following is obtained:

$$E=\frac{1}{\sqrt{16}\epsilon_0}\left(\frac{\gamma_c}{b}\right)^{1/3}L^{5/3}i^{2/3} \quad (73)$$

Evaluating the constant terms $$E=4.58\times10^{10}\left(\frac{\gamma_c}{b}\right)^{1/3}L^{5/3}i^{2/3} \quad (74)$$

For air, using $b=2.50\times10^6$ and $\gamma_c=0.9$ $$E=3.27\times10^8L^{5/3}i^{2/3} \quad (75)$$

Using a high-dielectric strength gas, with $b=2.50\times10^7$, and all other factors the same (74) becomes:

$$E=1.52\times10^8L^{5/3}i^{2/3} \quad (76)$$

Thus, at a given current density, and constant L, and $\gamma_c$, the voltage varies inversely as the cube of the dielectric strength of gas. Compare (75) and (76). The voltage generated decreases rapidly, directly as the 5/3 power of the length. Hence, the emphasis on very short nozzles. Holding $\gamma_c$, $b$, L constant, E varies as the ⅔ power of the current.

EXAMPLE IV $L=1\times10^{-3}$ meters (1 mm.) $i=8$ amps./meter$^2$ $\gamma=0.9$

| | FOR AIR by (75) | High Dielectric Gas by (76) |
|---|---|---|
| E VOLTS | 13,080 | 6,100 |

In Fig. 1 there is shown one form of my invention for converting the heat energy contained in a gas or vapor, at relatively high pressure and temperature, to electrical energy. To obtain controlled expansion and consequent satisfactory conversion of the gaseous heat energy in a chamber 2 to controlled directed kinetic power, and subsequent conversion thereof into electrical power by the slowing of the charged particles in the nozzle under the influence of the counterfield in the nozzle, the latter must be of gradually tapered form. Owing to the requirement for a very short nozzle length, L, and because the nozzle must be of gradually tapered form having a considerable change in cross-sectional area, the nozzle will have a very small cross-sectional area. However, in order to obtain the production of power on a large scale, it is necessary to have a large nozzle area. These conflicting requirements I have resolved by the provision of a plurality of nozzles 11a, 11b, 11c, etc. arranged side by side in the composite plate 5, 7, 9. This enables a sufficiently large total area of nozzle cross-section to be provided, thus enabling any power output to be attained.

The gas or vapor, containing aerosol particles, 1a, is admitted to chamber 2, at relatively high pressure and temperature. The chamber, 2, comprises two facing parallel walls 3 and 4, comprising layers of insulating material 5 and 6, such as ceramic, over conducting sheets 7 and 8 respectively. The conducting sheets 7 and 8, may comprise a metal such as copper, between ceramic plates 5 and 9, and 6 and 10, respectively. Within the composite plates 5, 7, 9 and 6, 8, 10 are formed a plurality of adjacent nozzles 11a, 11b, 11c . . . , etc., in plate 5, 7, 9; and 12a, 12b, 12c in composite plate 6, 8, 10. The nozzles 11a, 11b, 11c, are terminated in the conducting rectangular box 13, and the nozzles 12a, 12b, 12c are terminated in the conducting rectangular box 14. The purpose of the conducting boxes terminating the nozzles, is to discharge the aerosol particles or ions in the gas stream at the nozzle exit. The centers of the boxes, 13 and 14, can also be provided with wire felt pads, such as 15 and 16, between supporting meshes 17, 18 and 19, 20 respectively. These pads function to dissipate the excess velocity of the vapor issuing from the opposed nozzles, and also assist in discharging the charged aerosol particles. The boxes 13 and 14 constitute an enclosure, and the charged particles issuing from the nozzles tend to travel to the walls and discharge thereon. The electric field is set up between the wall 20 of the box 13 and the sheet 7 and this constitutes the counterfield against which the negatively charged particles in nozzles 11a, 11b, . . . , must move. Centerlines AA' and BB' define a section. Additional sections can be arranged in parallel stacks. In Fig. 1, for example, 24 and 25 comprise the ends of two additional sections. The nozzles themselves are constructed to obtain the desired reduction in velocity from inlet to exhaust, and are made with a taper of say 20°, so as to give controlled expansion.

The electrical length L of the nozzle is the distance between sheet 7 and the face 20 and the distance betwen sheet 8 and the face 22. The length L, according to my studies, should be as short as practically possible, preferably less than $10^{-2}$ meter; or better still say $3\times10^{-3}$ meters. The small value for L is required to reduce the effects of space charge. Excessive space charge occurs in long nozzles and tends to limit current flow, and to build up a high voltage. By the construction shown in Figs. 1 and 2, it is possible to obtain a relatively high current per unit area; and a relatively low voltage. These factors have been rather fully discussed in the preceding mathematical sections.

Within the chamber 2 are disposed parallel spaced conducting grids 27 and 28. Connected to the grids 27 and 28 is a high-frequency voltage source 29. The voltage between 27 and 28 is set sufficiently high to cause extensive ionization of the gas, in the space 30 between grids 27 and 28, thereby producing ions, 31, 32 of positive and negative sign. The distance between 27 and 28 should be small, so that a relatively low voltage can suffice to ionize the gas 1, and so that the ions can be formed within such a narrow sheet that they can be quickly drawn apart by the steady electric field applied between electrodes 7 and 8, before they can recombine. Thus, a positive potential is applied to plate electrode 7, and a negative potential is applied to plate electrode 8; and accordingly, the positive ions formed in space 30 are drawn toward the negative electrode 8, and the negative ions formed at the same time in space 30 are drawn to the positive plate 7. These ions, initially positively charged atoms or molecules, and free electrons and negatively charged atoms and molecules in space 30, quickly become attached to the aerosol particles 1a, suspended in the gas, 1. Thus at the entrance to nozzles 11a, 11b, 11c, the vapor comprises a suspension of negatively charged aerosol particles; and at the entrance to nozzles 12a, 12b, etc., the vapor comprises a suspension of positively charged aerosol particles.

The provision of charged aerosol particles, which may comprise liquid or solid particles, is then an important feature of this invention. My studies have shown that, in order efficiently to convert the kinetic energy of the vapor to electrical energy by doing work on the charged particles within the vapor in an electric counterfield, it is necessary to provide charged particles of sufficiently large mean diameter that they are carried along by the gas stream without much "slip." Small particles such as molecules, or electrons, can slip through the gas more readily, and thus make for a viscous loss of power, and also prevent the gas from effectively "pushing" the ions against the counterfield.

The positively charged aerosol particles, 33, are separated from space 30 by the steady field applied between plates 7 and 8. The positively-charged aerosol particles 33 become a part of the stream of gas, or vapor, entering the nozzles 12a, 12b, 12c, etc., whereupon as the gas expands the temperature and heat content drops, and the velocity and kinetic energy is increased. The charged aerosol particles, 33, enter the box 14, and are discharged on the walls 22, 23 or on the central pad 16, causing the entire box 14 to take on a positive charge. When the device has reached a steady state, a counterfield is set up by the positively charged box 14 between its side plate 22 and the electrode sheet 8. This causes a repulsion of the positively charged particles following in the gas stream in the nozzle. The positively charged aerosol particles are borne and entrained by the gas and are of very low mobility. It therefore follows that the gas must do work in shoving the particles against the counterfield; hence the kinetic power is converted to a time rate of increase of electrical potential energy, which appears at the load terminals 35 as electric power.

Simultaneously, the same type of action is occurring in the nozzles 11a, 11b, etc., with the negatively charged aerosol particles 34, and a negative counterfield is built up to oppose the downstream motion of the negative aerosol particles and to thereby convert the kinetic power of the gas stream in 11a, 11b, etc., to electric power at the load 35. The positive and negative charges at the box 14 and 13, respectively are neutralized, after building up to a desired level, by a flow of electrons, from 13 through the load terminals 35, to 14. A small part of the electric power generated between 13 and 14, across the load 35, can be tapped off, at 36, and used to supply the ionizing grids 27 and 28, and the separation electrodes 7 and 8. For example, if 25,000 volts are generated between 13 and 14, and across 35; then 2500 volts D. C. can be placed across 7 and 8, and 1000 volts at a high frequency, across 27 and 28.

The auxiliaries comprise an electrically isolated rectifier 38 and a high-frequency source 29. A portion of the power output is supplied through a reversing switch, generally indicated as 37. The reversing switch 37 periodically reverses the auxiliary input 36. This provides a square wave 39 applied across the transformer primary 40. Transformer secondary 41 supplies the rectifier 38, and the transformer secondary 42 supplies small A. C. motor 43 which operates the reversing switch 37. Transformer secondary 42 also supplies the high-frequency source 29.

The reversing switch can be constructed as shown. The reversing switch device comprises a small A. C. motor, having an extended shaft 44, upon which is mounted flywheel 45, slip rings 46 and 47, and split rings 52 and 53. Auxiliary power, from the main power line output at terminals 35, is fed into the slip rings 46 and 47 via brushes, 50 and 51, respectively attached to feeder line 36. Split ring 52 connects to slip ring 46, and split ring 53 connects to slip ring 47. Brushes 54 and 55 take off the square wave input 39 to the transformer primary 40.

In starting the generator, an outside A. C. power source 56, can be employed to feed power, through closed switch 57, to the line 58. This activates the transformer coil 42, which now acts momentarily as a primary, to activate the rectifier 38, through secondary coil 41. Also, motor 43 is caused to turn, and high-frequency source 29 is activated. The voltage across 13 and 14 is quickly established, and the switch 57 then opened. This system is now entirely self-operating.

Fig. 2 is a fragmentary view of the nozzle plate normal to the face 22, with particular regard to the throat area of the nozzle 12, compared to the total area defined by rectangle ABCD, as hereinbefore described.

Figure 3:
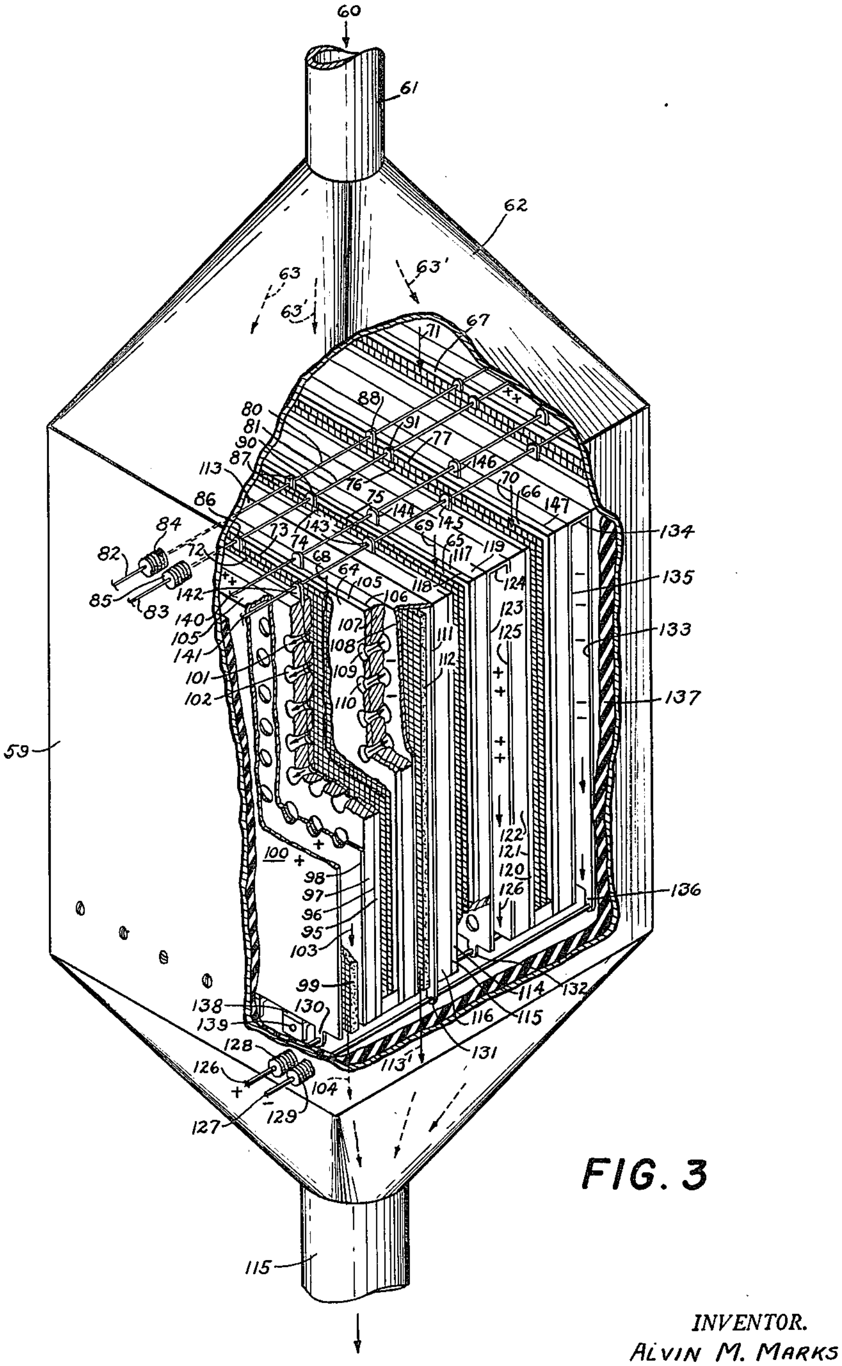
Fig. 3 shows a fragmentary perspective cut-away view of the assembly of the device of Fig. 1.

In Fig. 3, there is shown, in perspective cutaway, the elements shown in Figs. 1 and 2. Aerosol 60 is shown entering the inverted funnel 62 through inlet pipe 61. Aerosol 60 is distributed as shown by the arrows 63, 63′, 63″, to chambers or spaces 64, 65, 66 and 67, which correspond to the chamber or space 2 between faces 3 and 4 of the nozzle plates shown in Fig. 1. The arrows 68, 69, 70, 71 indicate the flow of the aerosol 60 into the entry spaces 64, 65, 66 and 67, respectively. Within each of the entry spaces is positioned a pair of ionizer grids which may consist of suitably supported pairs of wire mesh, such as 72, 73 in entry space 64; 74, 75 in entry space 65, and 76, 77 in entry space 66. Corresponding meshes are connected by common leads 80, 81 to the ionizer terminals 82, 83, which pass through the enclosure 59, and through the insulating bushings 84 and 85. The lead 80 connects to meshes 75, 77, etc. through the lugs 87, 88, etc., respectively. In a similar manner, the lead 81 connects through the lugs 90, 91, etc., to the meshes 74, 76, etc.

The composite nozzle plate 95, 96, 97, 98 is shown broken away. Conducting layer 96 is sandwiched between insulating layers 95 and 97. Layer 96 may be copper or graphite, and layers 95 and 97 may be ceramic. Conducting faces 98 and 100 may also comprise copper or graphite, and are bent, or otherwise formed into a U at 105, so as to prevent the aerosol from entering there. The direction of flow in the nozzles 101, 102, etc. is indicated by arrows shown therein. The nozzles 101, 102, pass through the layers 95, 96, 97 and 98, which also form the confining walls of these nozzles, in side by side array. The faces 98, 100, and closed top 105 form a conducting enclosure, or thin rectangular box into which the nozzles 101, 102, etc. discharge. This enclosure has a central wire felt pad 99, upon which the excess aerosol velocity can be dissipated.

The aerosol issuing from the nozzles 101, 102, etc. at lower pressure than at the entry spaces then flows as indicated by arrows 103 out of the enclosure, toward the exit pipe 115 as further indicated by the arrow 104.

In a similar manner, conducting layer 106, is sandwiched between insulating layers 105' and 107. Conducting layers 108 and 111 form a U enclosure having a closed top 113 and an open bottom, through which the spent aerosol issues, as shown by arrow 113'.

Composite nozzle plate 105', 106, 107, containing nozzles 109, 110, etc., and composite nozzle plate 114, 115, 116 containing nozzles (not shown) contain oppositely directed nozzle streams all emptying into the enclosure 111, 113, 108, these streams all impinging their excess velocity upon the felt wire pad 112 located within this enclosure and giving up their charges, all of the same sign, say negative, to the walls of the enclosure 111, 113, 108.

In like manner, the aerosol streams entering at 69 and 70, flow in opposed directions through composite nozzle plates 117, 118, 119 and 120, 121, 122 and empty into enclosure 123, 124, 125, and exit toward pipe 115 as shown by arrow 126. The central wire felt pad in enclosure 123, 124, 125 has been omitted for clarity of illustration.

Alternate enclosures are charged positively and negatively. Thus, if enclosure 111, 113, 108 receives and discharges the negatively charged streams, then, the enclosure 123, 124, 125 receives and discharges the positively charged streams.

Bus 126 extends through the insulated bushing 128 and through the casing 59 connecting with lug 130 attached to positively charged enclosure 98, 105, 100, and with lug 132 on the next positively charged enclosure 123, 124, 125. Thus, all the positively charged enclosures are electrically connected to the bus 126 which is brought out through the casing 59.

Bus 127 is connected to the lug 131 attached to the negatively charged enclosure 111, 113, 108, and to the next adjacent negatively charged enclosure 133, 134, 135 by lug 136. Thus, all negatively charged enclosures are electrically connected to bus 127 and brought through the casing 59 through the insulated bushing 129.

The inner walls of the casing 59 can be formed of insulating material 137, such as slate, and all the plate elements can be located on suitable insulating supporting members such as angle iron 139, and ceramic insulator 138.

The separation electrodes comprising conducting sheets 96, 115, 121, etc., are all connected electrically by lugs 142, 143, 145 to lead wire 141; and the separation electrodes 106, 118, 147 are all connected electrically to the lead wire 140. Lead wires 140 and 141, and the separation electrodes to which they are connected are maintained at a sufficient steady potential difference, by an auxiliary supply source tapped from, but electrically isolated from, the main power output, to effect the separation of the ions produced by the ionizer grids, as explained in connection with Fig. 1. In Fig. 3, lead 140 is maintained positive, and lead 141 is maintained negative.

By the construction of Fig. 3 there is provided a plurality of nozzle plates. In this manner, there is obtained a short nozzle path length, with any large cross-sectional area of nozzle required. Minimum practical voltage output, and large amperage, to any extent required is thus assured.

A single pair of ionizer grids serves to ionize and charge the aerosol particles and to charge the aerosol in opposing directions through a pair of adjacent nozzle plates, thus utilizing both the negative and the positive ions created between the ionizer grids.

Pairs of nozzle plates then discharge, in opposing directions, charged particles of the same sign into the same enclosure.

This pattern is repeated, and like elements are electrically held together. Auxiliary apparatus such as shown in Fig. 1 can be employed in connection with Fig. 3.

Figure 4:
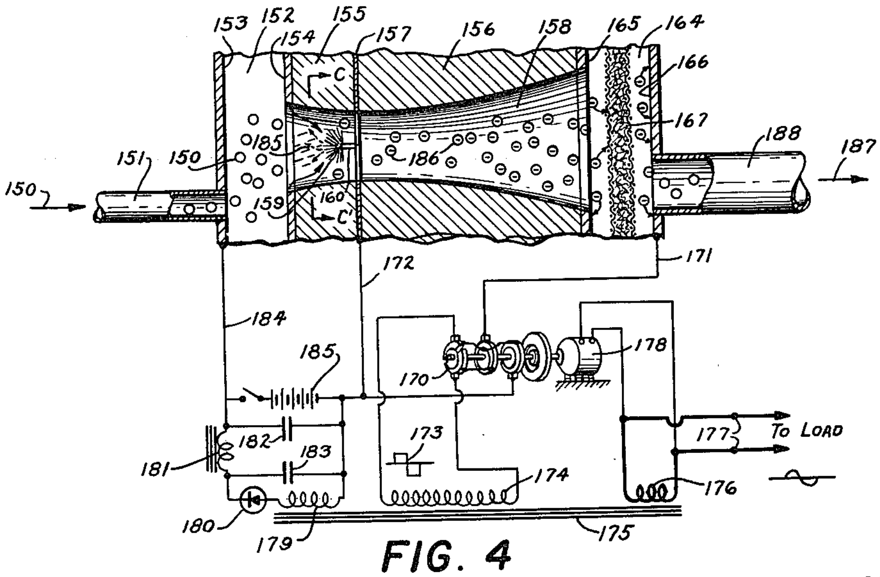
Fig. 4 is a fragmentary, partly diagrammatic cross-section, along a nozzle axis, of another type of ion convection generator employing a point ionizer means.

Fig. 4 is a modification of my invention, in which ions of one sign, and charged particles of one sign are produced. These may be either positive or negative, depending on the conditions of operation. For the sake of simplicity only one nozzle is shown, although it will be understood that the nozzle array and certain other features of construction in Figs. 1, 2 and 3 may be employed.

A suitable aerosol is supplied through inlet pipe 151 to the chamber 152 which comprises a rectangular conduction box having conducting walls 153 and 154. The nozzle plate comprises insulating plates 155, 156, sandwiching conducting plates 157. Mounted within the nozzle, which is generally indicated by 158, is a plurality of points 159 which are shown radiating from contact 160.

Figure 5:
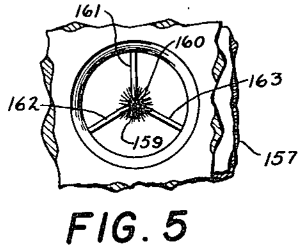
Fig. 5 is a cross-section of the device of Fig. 4, along a plane normal to the nozzle axis.

Fig. 5 is a section on the line C—C' in Fig. 4. The pointed conductors 159 can be mounted on the conducting member 160 which is supported by the conducting structure 161, 162 and 163, attached to, or forming an extension of the conducting sheet 157. The nozzle 158 empties into chamber 164 which also comprises a rectangular conducting box having facing walls 165 and 166. The center of the chamber can also be provided with a wire felt pad 167. The electric circuit employed for actuating this device comprises a reversing switch 170 similar to that shown in Fig. 1. The reversing switch 170 functions to reverse the direct current taken off from leads 171 and 172, and to produce therefrom a square wave 173 which is applied to transformer primary 174. The transformer 175 comprises a step-down transformer which may for example have a step-down ratio of about 100 to one; and which functions to reduce the potential and to increase the amperage output of the generating system. The output is taken off the secondary winding 176 and transmitted to the load via the terminals 177. A small portion of the output is tapped from the secondary 176 and utilized to operate the small reversing switch motor 178. Another secondary coil 179 is utilized to tap off a further small proportion of the output power and to rectify back to direct current by means of the conventional rectifier components 180, 181, 182 and 183. The rectified voltage is applied across 172 and 184 and utilized to operate the point ionizers 159. A starting battery 185 is employed to initiate the ionization in first starting the device, and is subsequently disconnected.

The operation of the device shown in Figs. 4 and 5 is as follows: Aerosol particles 150 are admitted to chamber 152 and a positive potential is applied to the wall 154 of the chamber 152 relative to the points 159. A potential difference of about 3000 volts may be maintained. Each point 159 will emit about 1 to 2 microamperes in air; or about 50 microamperes if the atmosphere employed is pure nitrogen. If 40,000 nozzles are employed per square meter (one of each 5 mms. x 5 mms. of nozzle-plate area) and 10 amperes per square meter output, with nitrogen as the gas, is to be obtained, than 5 points will suffice for ionization in each nozzle. Other conditions of operation will, of course, alter these calculations. Electrons, emitted from the ionizer points of 159 are shown by the minus signs 185. These electrons become attached to the aerosol particles 150 and cause these particles to be negatively charged. Thereafter, the operation is similar to that previously described. The box 164 becomes negatively charged relative to the conducting sheet 157, and the circuit is completed by the flow of electrons from 164 through lead 171 through the reversing switch 170 through the transformer primary 174 and back to the conducting sheet 157, thence to the ionizer points 159 and out from the points into the gas stream again as free electrons 185. Aerosol particles 150 are negatively charged in passage through the nozzle in the vicinity of the ionizer points. The negatively charged aerosol particles are indicated as 186. The spent and discharged aerosol particles 187 flow through the exit pipe 188. It will be understood that the inlet pressure and temperature at 151 is higher than the pressure at 188.

When the device, in Fig. 4, is operated with a negatively charged aerosol, electrons 185 emitted from points 159 may remain free, or become negative ions by attachment to gas atoms or molecules depending on the nature of the gas. In either case, the mobility of the free electrons or negative ions will be relatively high, and the gas stream will be unable to drive the electrons or negative ions down stream against the repelling electric field maintained in the conversion space between sheets 157 and 165. The electrons or negative ions tend rather to move toward the plate 154, which is positively charged relative to the points 159, and are thus subjected to bombardment by the large number of uncharged aerosol particles 150, which thereupon pick up the free electrons or negative ions and become charged. The charged aerosol particles, however, have extremely low mobility and therefore are entrained by the gas, and are constrained to move forward into the conversion space of the nozzle, in which a repelling electric field is maintained between conducting sheets 157 and 165. In the conversion space, the charged aerosol is slowed down by the repelling electric field and the kinetic power is converted to electric power as previously described.

Figure 6:
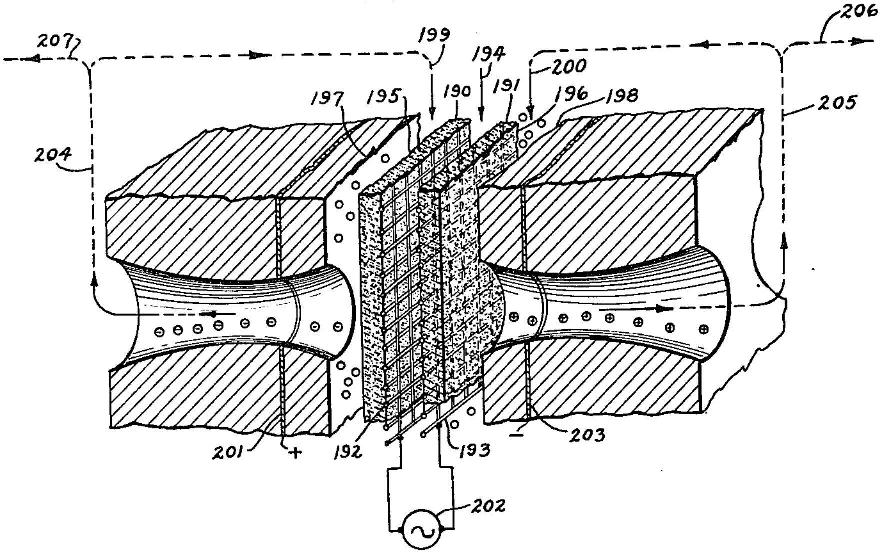
Fig. 6 is a fragmentary perspective view of still another form of this invention employing a porous grid ionizer structure.

In Fig. 6, there is shown a fragmentary view of another embodiment of this invention. The construction shown in Fig. 6 is similar to that of Fig. 1 except for the ionizer grids, which comprise porous ceramic plates 190 and 191 having conducting meshes 192 and 193 on their inner faces. The porous grid structure serves to confine the readily ionizable gas which is shown entering the space between the porous grid-plates as arrow 194. The readily ionizable gas employed may comprise hydrogen, nitrogen, or other suitable gas. This gas is supplied between the porous grid structure at a somewhat higher pressure than that of the gas in the spaces between the outer faces 195 and 196 of the porous grid structure, and the faces 197 and 198 of the nozzle plate array. A highly ionized layer of positive and negative charges are produced between the ionizer meshes 192 and 193. The meshes 192 and 193 may be activated from high frequency source 202.

In the spaces between faces 195 and 197 and 196 and 198, there is introduced an aerosol-containing-gas of high dielectric strength indicated by the arrows 199 and 200. Such a gas for example may comprise diphenyl chloride containing liquid droplets or solid particles of high molecular weight diphenyl chloride. In certain cases, it may be desirable to employ chemically different aerosols for the negative ions and the positive ions. Thus, for example 199 might comprise a low molecular weight diphenyl chloride gas containing a suspension of high molecular weight polymeric diphenyl chloride for the aerosol particles. The purpose, in the case of aerosol 199, is to provide an aerosol particle having a high binding or attractive force for the electrons or negative ions introduced into the spaces between 195 and 197 under the attraction of the positively charged plate 201. The electrons or negative ions are caused to traverse the porous structure 190, being drawn out of, or from, the highly ionized layer of gas 194.

In similar manner positive ions may be drawn out of the ionized sheet between the meshes 192 and 193 and caused to traverse the porous structure 191 under the attraction of the negatively charged conducting plate structure 203.

The gas pressure of the readily-ionizable-gas 194 between the porous grid structure is maintained at a higher pressure than the gas pressure of the gas on the outside of the porous grid structure, thus causing gaseous diffusion from the inner to the outer faces of the porous grid structures, thereby aiding the migration of the positive and negative ions outwardly through the porous grids. The gas in the space between the faces 191 and 198, indicated by the arrow 200, may comprise an aerosol metal vapor, such as mercury vapor containing suspended therein condensed droplets of mercury.

Fig. 6 shows two aerosol working substances in two closed circuits—one for the gas-polymeric aerosol working substance, such as diphenyl chloride vapor, and a second chemically different aerosol working substance such as mercury vapor. Gaseous diffusion aids the positive and negative ions of the readily-ionizable-gas, such as, nitrogen or hydrogen, to diffuse, aided by their respective attracting fields into both of the aforementioned aerosols. The readily-ionizable gas may later be separated from the aerosol vapors and can be drawn off by pumping so as to produce a continuous circulatory cycle for the two different working substances.

The two thermodynamic cycles with the two working substances are indicated by the dotted closed curves 204 and 205. Arrows 206 and 207 indicate the small amounts of readily-ionizable-gas which may be exhausted from the system or returned continuously after purification to 194. An electrical system similar to that shown in Fig. 1 can be employed in connection with Fig. 6.

Figure 7:
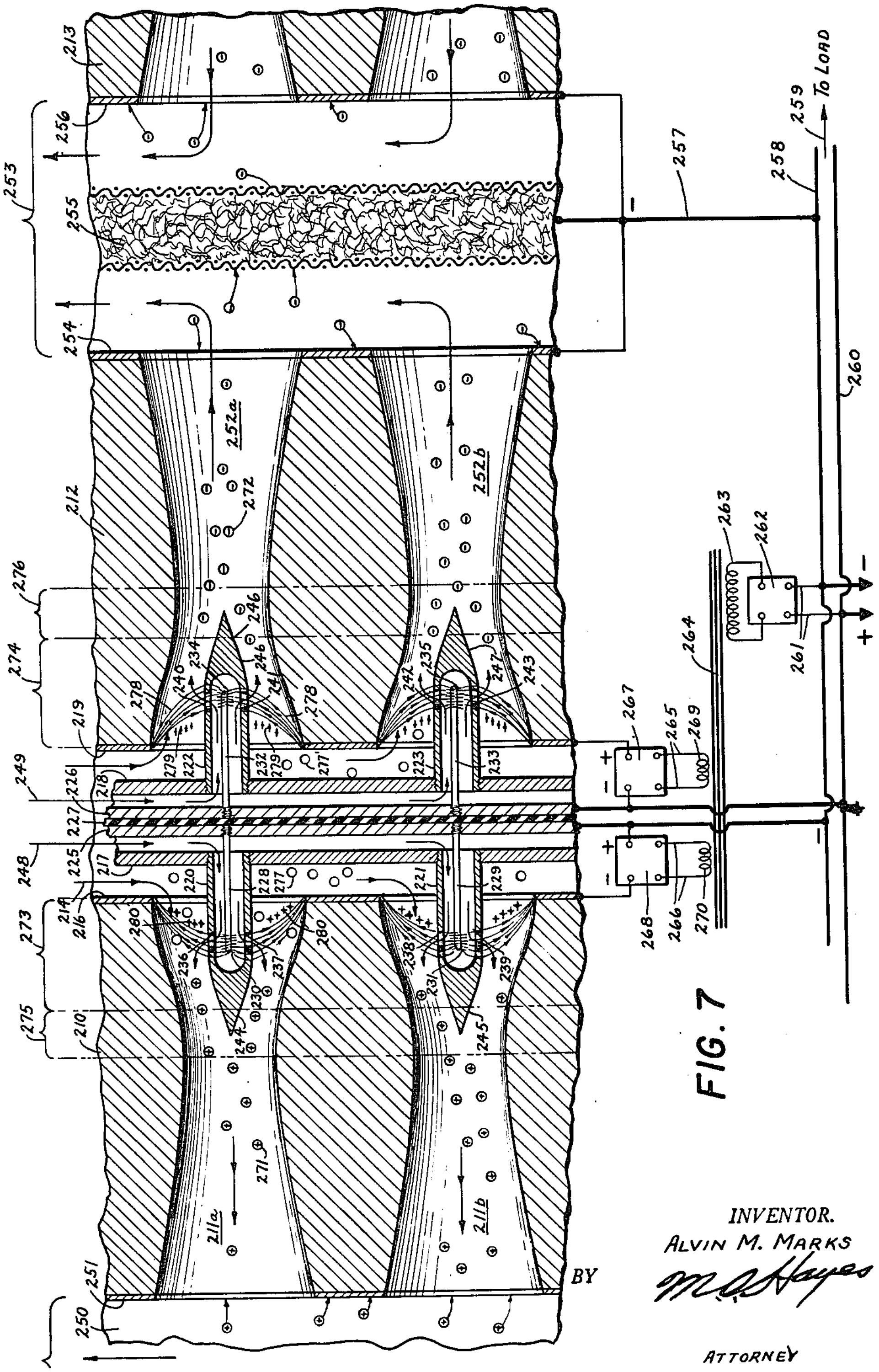
Fig. 7 is a cross-section of still another form of this invention, in which the steps of combustion and ionization are combined.

Fig. 7 is another form of my invention, adapted to operate directly from combusting gases, which is constructed as follows:

Nozzle plate 210 comprises an array of nozzles 211*a*, 211*b*, etc., formed side by side in a heat resistant ceramic insulating plate. A series of nozzle plates such as 210, 212, 213 are arranged in parallel stacks and fed with an oxygen rich gas such as air generally indicated by arrows 214 and 215. The gas is fed between faces 216 and 217, and faces 218 and 219. Face 216 and face 219 are formed from metal sheets which can be deposited electrolytically on the face of the ceramic nozzle plate 210, and the ceramic nozzle plate 212. Plates 217 and 218 may be made of either insulating or metallic materials.

Hollow fingers 220, 221, etc., are screwed or otherwise fastened to holes in the plate 217. In a similar manner hollow fingers 222 and 223 are fastened into holes in the plate 218. Between plates 217 and 218 are two conducting plates 225 and 226 separated by an insulating plate 227. Into the conducting plate 225 there is screwed or otherwise fastened conducting probes 228 and 229. At the end of the conducting probe a plurality of points 230 and 231 are mounted on 228 and 229, respectively. In the same way probes 232 and 233 are fastened to plate 226. Probes 232 and 233 each have a plurality of conducting points 234 and 235. The conducting probes are placed within the hollow fingers 220, 221, 222 and 223. The conducting points are located within the hollow fingers beneath a series of holes, or perforations 236 and 237 on hollow finger 220, and 238, 239 on hollow finger 221. Holes 240 and 241 are located on hollow finger 222, and 242 and 243 on hollow finger 223. The hollow fingers are formed from a resistant insulating-ceramic material and tips of the fingers are formed into stream-line points 244, 245, 246 and 247.

Combustible gas such as hydrogen, methane, ethane or gasoline vapor, etc., are shown entering the space between the plates 217 and 225 as arrow 248, and the same or similar type of gas is shown entering the space between 226 and 218 as the arrow 249. The combustible gases 248 enter the hollow fingers 220 and 221 and are forced out of orifices 236, 237 on 220 and 238, 239 on 231. In similar manner combustible gases 249 enter the hollow fingers 222 and 223 and are forced out of orifices 240, 241 and 242, 243 respectively. The nozzles 211*a*, 211*b* empty into the conducting box 250, and the charged aerosol particles discharged onto facing wall 251. The nozzles 252*a*, 252*b* in nozzle plate 212 empty into the conducting box 253 and discharge on the facing wall 254, the wirefelt pad 255, or the facing wall 256. The conducting box 253 is shown receiving and discharging negatively charged aerosol particles, and 253 thus takes on a negative charge, which is drawn off by conductor 257 and communicated to the negative bus 258, to the load 259. The positively charged bus 260 connects to the plate 226.

Referring now to the nozzles 211*a*, 211*b*, which are shown operating with a positively charged aerosol, the positively charged aerosol discharges on the walls 251, . . . etc., of the conducting box 250. The conducting box 250 is connected to the positive bus 260 by a conducting wire (not shown). The plate 225 is connected to the negative bus 258. A small portion of the power from the buses 258 and 260 is taken off by the leads 261 and fed to a reversing switch 262, shown in block diagram, and thence to transformer primary 263. The transformer core is indicated by 264. Leads 265 and 266 feed power into rectifiers 267 and 268 respectively, and provide isolated D. C. outputs from the transformer secondaries 269 and 270, respectively. The outputs from the rectifiers 267 and 268 are utilized to produce a supply of ions, which ions are employed to charge the aerosol particles entering the nozzles, as hereinafter described.

The combustible gases 248 and 249 which may comprise hydrogen, methane, ethane, gasoline vapor, etc., have the property of being readily-ionizable, i. e. free electrons can exist within the gas for a considerable length of time without attachment to the gas molecule. This means that additional ionization by impact of these electrons can be achieved, and strong electron currents can be sustained.

In operation, then, the conversion of the kinetic power of the gas in the nozzles 211*a*, and 211*b*, through the intermediation of the positively charged particles, and the repelling field between layers 251 and 216, is generally similar to the process described in connection with Fig. 1. In the same manner, the conversion of the kinetic power of the moving gases to electric power in nozzles 252*a* and 252*b*, through the intermediation of negatively charged particles 272, is again generally similar to that described in Fig. 1.

The modification shown in Fig. 7 is distinguished from the preceding figures in that the combustible gases 248 issuing from orifices such as 236 and 237 combine with the oxygen rich gas 214 and produce by an exothermic chemical combination, or the process known as combustion, an increase in temperature and heat content, in the region within the nozzle generally indicated by the brackets 273, and 274. Subsequently in the region of the throat of the nozzle generally indicated by the brackets 275, and 276, the heat energy previously given to the gas by the process of combustion, is employed to increase the kinetic power of the aerosol by the expansion of the gas between the regions 273 and 275, and 274 and 276. Thereafter, the conversion from kinetic power to electrical power is generally similar to the process previously described in connection with the preceding figures. The aerosol particles within the gas 214 and 215 are originally uncharged, and are indicated as 277 and 278. These aerosol particles comprise heat resistant materials, i. e., aerosol particles such as silicon dioxide, or metal oxides, such as iron oxide, which may be produced in known manner. For example, colloidal liquids, containing these particles in suspension can be introduced into the gas streams 214 and 215 prior to the entrance of said gas streams into the device of Fig. 7.

The operation of the ionization and charging of the aerosol particles may be understood by reference to nozzle 252*a* and more particularly to the points 234, at the end of the probe 232. An electric field 278, is applied by means of the rectifier 267, which is connected to the plate 219 at its positive terminal, and to the plate 226 at its negative terminal. A probe 232 conducts the potential from the plate 226 to the points 234. The finger 222, being an insulating material and containing the orifices 240 and 241, permits the electric field to traverse, concentrate and terminate at the point 234. The points 234, being located in the readily-ionizable-gas 249, emit free electrons. The free electrons are directed by the field 278 toward the plate 219. These free electrons are shown as minus signs, generally indicated as 279. The free electrons are thus drawn out into the region of the flowing aerosol, in which there are present molecules having electronic affinity, such as oxygen and water. These produce negative ions of intermediate mobility. Uncharged aerosol particles also flow into the nozzle 252*a* and are caused to collide with the concentration of free electrons and negative ions 279 at the entrance of the nozzle. The uncharged aerosol particles 278 pick up these negative charges, and become negatively charged aerosol particles 272. Thereafter, conversion of kinetic power to electric power proceeds as previously described.

The action of the positive ions in nozzles 211*a*, 211*b*, etc., is similar. Slightly higher ionizer voltages must be supplied by the rectifier 268, in order to obtain a positive ion current equal in magnitude to the negative ion current drawn off in the nozzles 252*a* and 252*b*. The positive ions are shown by the plus signs 280, and concentrate at the entrance to the nozzles 211*a*, 211*b*, etc., in the region of the combusting gases. Position ions attach themselves to the uncharged aerosol particles 277 etc., and become positively charged aerosol particles 271; whereupon, the conversion of kinetic power to electric power proceeds as previously described.

It will be understood that the chemical composition of the gases 214, 248 may be selected so as to favor the formation and retention of positively charged particles, and the chemical composition of the gases 249, 215 may be selected to favor the formation and retention of negatively charged aerosol particles. This may be done by selection of materials having positive ions, and negative ion combining affinities in accordance with known chemical laws.

Fig. 8 is a diagram of a nozzle according to this invention, more particularly illustrating a novel thermodynamic and electrodynamic cycle which may be employed. In the nozzle between the sections $A_0$ and $A_1$ the high pressure, high temperature aerosol-containing-gas of heat content $H_0$, is reduced to a low heat content $H_1$. Accordingly, the velocity of the gas is increased from section $A_0$ to $A_1$. Between the sections $A_0$ and $A_1$ ionization and charging of the aerosol particles may take place, as in Fig. 4. In Figs. 1 and 6, the ionization of the gas occurs just before it enters the section $A_0$ and the aerosol particles are charged between the grid ionizer and the section $A_1$. It will be understood that the distance between the ionizer grids and the face of the nozzle-plate, and also the distance between the sections $A_1$ and $A_2$ are minimized to reduce the space charge effects.

In the space between the grid ionizer and $A_1$, or the space between $A_0$ and $A_1$, an ion-attracting rather than an ion-repelling field is employed. The section $A_1$ has been shown in the various figures as containing a conducting sheet, such as 7 and 8 in Fig. 1. At the outlet nozzle section $A_2$ is a conducting sheet such as 20, or 22 in Fig. 1, forming the walls of the rectangular conducting box in which the aerosol particles are discharged after issuing from the nozzles. The nozzle is constructed in such a manner that the cross-sectional area A is at least inversely proportional to the velocity of the aerosol at section A. The repelling electric field is applied between the conducting sheets between sections $A_2$ and $A_1$. The charged aerosol particles, and the entraining gas, are slowed down by the repelling field between $A_1$ and $A_2$ causing the decrease in velocity from sections $A_1$ to $A_2$, and thus the kinetic power of the gas stream and aerosol particles is changed to electrical power as previously described.

Thus, there is provided a nozzle in which a thermodynamic change occurs in the first part of the said nozzle; that is, the heat-power content is lowered, and the kinetic power correspondinglly increased in the first part of the nozzle. Simultaneously therewith, the aerosol particles entrained in the gas are charged. In the second part of the nozzle a repelling electric field is located, and in the second part of the nozzle the velocity of the aerosol is increased, at a rate at least equal to the inverse proportion of the velocity. Thus, in one embodiment of this invention no thermodynamic charge occurs in the second part of the nozzle, but the kinetic power produced in the first part of the nozzle is substantially completely converted to electric power. Fig. 11 shows that there is a slight excess of velocity on the exit to the nozzle, constituting 1 to 10 per cent of the initial kinetic power, depending on nozzle dimensions. It will be understood that the area of the nozzle may be increased at a rate somewhat greater than in inverse proportion to the velocity, in which case there will be simultaneous thermodynamic and electrodynamic change; whereby a further conversion of heat power to electrical power will take place, simultaneously through an intermediate change of kinetic power.

However, it will be understood that it is not desirable for the nozzle cross-section to increase at a rate less than the inverse proportion of the velocity while converting kinetic to electric power, since, in such an instance, a portion of the kinetic power will be converted back into heat power, which will be manifest by increasing the pressure of the gas, and increasing its temperature, as section $A_2$ is approached. This would result in a loss of efficiency in the conversion of heat-to-electric power.

Fig. 9 shows a thermodynamic cycle, and a means for introducing the aerosol which may be utilized in carrying out this invention.

The boiler 280 provides the heated, high temperature, high pressure working substance fed through pipe 281 which branches at 282 into the pipes 283 and 284. Hydrogen chloride vapor is introduced into the T 285. Ammonia vapor is introduced into T 286. The pipes 287 and 288 feed into pipe 289. The hydrogen chloride and ammonia vapors react to form an ammonium chloride aerosol which is fed to the electric generator 290 of this invention, such as that shown in Figs. 1 and 3. The aerosol is reduced in temperature and pressure, and the kinetic power produced in the process, is converted to electrical power which appears at the terminals 291. The vapor is further cooled by the condenser 292 and is returned to the boiler 280. The ammonium chloride solution can be decomposed electrolytically, by a portion of the output power, and re-used. This well-known process step is not shown.

Obviously many modifications and variations of the present invention are possible in the light of the above teachings. It is therefore to be understood that within the scope of the appended claims the invention may be practiced otherwise than as specifically described.

I claim:

1. A method of converting heat energy into electrical energy, said method comprising ionizing the gas of an aerosol and charging the particles thereof, simultaneously increasing the velocity and decreasing the heat content of the said aerosol, passing said charged aerosol through a repelling electric field, and electrically discharging said aerosol particles.

2. The method according to claim 1, in which the said aerosol particles have a mobility *k* of the order of .001 to .05 times the velocity divided by the electric intensity of the repelling electric field where *k* is the velocity imparted to the particles, through the gas in which it is contained, by a field of unit electric intensity.

3. A method of converting heat energy into electrical energy, employing an aerosol, comprising the steps of ionizing the gas and charging the particles of said aerosol, while simultaneously increasing the velocity and decreasing the heat content of the said aerosol, slowing the said charged particles by an electric field and electrically discharging said aerosol on a collector electrode.

4. In a method of converting heat energy into electrical energy through the medium of a suspension of particles entrained in a gas, the steps comprising the simultaneous ionization of the said gas in an ionizer, the charging of the said particles with ions, and the expansion of said gas to increase the directed velocity thereof at the expense of the heat content of the gas, and the slowing of said charged medium in a repelling electric field and discharging of said charged particles on collector electrodes, whereby an electric current is caused to flow through an electrical load between said collector electrodes and the ionizer.

5. The method of converting heat into electric energy that comprises decreasing the heat content of an aerosol, converting such decrease to increased kinetic energy while simultaneously ionizing and charging said aerosol, converting a decrease in kinetic energy of said charged aerosol, obtained by passing said charged aerosol through a repelling electric field, into an increased electric potential energy, and applying said aerosol to a load at said higher electric potential energy.

6. The method of converting heat into electric energy that comprises simultaneously ionizing and charging an aerosol while converting the thermodynamic energy of said aerosol into kinetic energy, then decreasing the kinetic energy of said charged aerosol while maintaining the temperature and pressure constant by passing said charged aerosol through a repelling electric field, whereby the electric potential energy of said charged aerosol is increased, and discharging said charged aerosol at said increased electric potential energy.

7. The method according to claim 6, in which the thermodynamic energy is maintained constant during decrease of kinetic energy of the charged aerosol by increasing the cross-sectional area of the aerosol in inverse proportion to the velocity of said aerosol.

8. The method according to claim 6 in which the thermodynamic energy is further converted into electric energy during decrease of kinetic energy of the charged aerosol by increasing the cross-sectional area in greater than inverse proportion to the velocity of said aerosol.

9. The method according to claim 6, in which said aerosol particles are of such size that the ratio of the velocity of said charged particles to the velocity of the gas, due to the action of the repelling electric field on said charged particles, is between .001 and .05.

10. In the method of converting heat energy into electrical energy, the steps comprising producing a sheet-like zone of ionization in an aerosol, creating opposing streams of said aerosol by separating positive and negative ions from said zone, simultaneously charging said opposing streams of said aerosol while decreasing the heat content and increasing the kinetic energy of said streams, passing said streams through repelling electric fields, and increasing the positive and negative potential energies of the positively and negatively charged aerosols, respectively, by decreasing the kinetic energies of said aerosols, and discharging said aerosols at increased positive and negative potential energies respectively.

11. The method according to claim 1 in which said steps are carried out in zones the cross-sectional area of which is large compared to the path length of said zones.

12. A method of converting heat energy into electrical energy, comprising the steps of moving a charged aerosol including moving particles against a repelling electric field and discharging said aerosol, in which the ratio of the velocity of said particles relative to the gas to the velocity of the gas is between .001 and .05.

13. In a device for converting heat to electric energy, a layer-like inlet chamber, a layer-like conducting outlet chamber, a plurality of adjacent nozzles forming a layer-like element intermediate said chambers, means for supplying an aerosol to said inlet chamber, means for ionizing and charging said aerosol at the entrance to said nozzles, and an electrical output circuit for discharging said aerosol, said circuit including a discharge electrode within said outlet chamber and a conductor coupling said discharge electrode with said ionizing means.

14. In a device for converting heat to electric energy, a layer-like inlet chamber, a layer-like conducting outlet chamber, a plurality of adjacent nozzles forming a layer-like element intermediate said chambers, means for supplying an aerosol to said inlet chamber, means for ionizing and charging said aerosol at the entrance to said nozzles, and an electrical output circuit connected between said ionizer and said conducting chamber for discharging said aerosol said circuit including a discharge electrode within said outlet chamber and a conductor coupling said discharge electrode with said ionizing means.

15. A device according to claim 13, in which a central layer-like inlet chamber is formed by the inner walls of opposingly directed first and second layer-like nozzle elements, the outer walls of said first and second nozzle elements defining a first and second conducting outlet chamber, positive and negative ionizing means for charging said aerosol at the entrances to said first and second nozzles respectively, and an electrical output circuit connected between said first and second conducting outlet chambers.

16. In an ion convection generator, a nozzle which is divided into fore and aft sections, inlet and outlet chambers interconnected by said nozzle; an aerosol comprising a suspension of particles in a gaseous medium, said particles entraining said gaseous medium; an ion source in the fore section of said nozzle adapted to charge said particles, whereby said aerosol flows and expands from high pressure and heat content to low pressure and low heat content in the fore section of said nozzle and whereby the time rate of decrease of the heat content of the flowing aerosol is converted into an increase in the velocity and kinetic power of the said aerosol; means providing an electric field along the aft section of said nozzle, such field having a high potential at the outlet chamber and a low potential at the ionizing section capable of exerting a slowing force upon said aerosol, whereby the velocity and kinetic power of the aerosol is decreased; a collector electrode adapted for discharging the said charged particles at said outlet chamber; and an electrical load to absorb the electrical power generated, said load being connected in a circuit with said outlet chamber and said ionizing section.

17. In an ion convection generator according to claim 16, a conducting layer between the fore and aft sections of the said nozzle and an electrical circuit including said layer, whereby the repelling field terminates on said layer; and, whereby said conducting layer is made to electrically attract ions at the entrance to said nozzle.

18. In an ion convection generator, parallel plate structures, a plurality of opposingly directed nozzles in said parallel plate-structures, a layer-like ionizer located in the space between said nozzle-plate structures adapted to produce positive and negative ions, and separation means for said ions comprising conducting layer-like electrodes sandwiched between the outer faces of said nozzle plates in the vicinity of the throats of said nozzles, whereby an electric potential difference, applied between the said electrode-layers in the said nozzle plates, causes positive ions to be removed from the ionizer and to travel toward the negatively charged layer-electrode, and causes negative ions to travel from the ionizer toward the positively charged layer-electrode.

19. In apparatus according to claim 18, charging means adapted to charge aerosols in the opposingly directed nozzles oppositely.

20. In apparatus according to claim 18, charging means adapted to charge aerosols in the opposingly directed nozzles oppositely, said nozzles being adapted to expand aerosols therein, thereby converting heat-power into kinetic-power, means to provide a repelling-electric field within said nozzles, and an electric power output circuit including discharge electrodes proximate said nozzles whereby the kinetic-power is converted to electric-power.

21. The method of ionizing and charging an aerosol, comprising ionizing a readily-ionizable-gas and then introducing ions from said readily-ionizable gas into an aerosol-containing-gas of higher dielectric strength.

22. In an apparatus for ionizing an aerosol containing a gas of high dielectric strength, an ionizer comprising means for ionizing a readily-ionizable-gas and means for introducing said ions from said readily-ionizable-gas into said aersol.

23. In an apparatus for ionizing a first gas of high dielectric strength, means comprising a point ionizer located within a second readily-ionizable-gas, and means comprising an orifice whereby ions formed in the second gas are ejected into the first gas.

24. In an apparatus for ionizing a first gas of high dielectric strength, means comprising a porous grid ionizer, said porous grid ionizer enclosing a second readily-ionizable-gas, and means for causing ions formed in said porous grid ionizer to pass through said porous grid into said first gas.

25. The method of producing electric-power from the heat-power of combustion, comprising, causing the combustion of a fuel-gas with an oxygen-rich gas, said combusting mixture containing refractory aerosol particles, ionizing and charging said combusting aerosol, expanding said aerosol to convert its heat-power to kinetic-power, and passing said charged aerosol through a repelling electric field and electrically discharging said aerosol particles.

26. In an ion convection generator, a nozzle having fore and aft sections, said aft section adapted to maintain an electric field, an ionizer element at the entrance to said nozzle, and a hollow finger having an orifice for introducing fuel gas at the entrance to said nozzle, said ionizer element being located within said hollow finger.

27. In an electrical exciting system for an ion-convection-generator having an ionizer element, a reversing switch for periodically reversing the electrical output of the said generator, a transformer having a plurality of primary and secondary windings, said reversing switch feeding alternating electric power into said primary, and said ionizer being fed from said secondaries with a portion of the output power.

28. An electrical exciting system for an ion-convection generator, said system comprising an ionizer means, means for electrically isolating a portion of the output power of said generator, and for feeding said portion to said ionizer means.

29. Apparatus according to claim 28 in which said isolating means comprises a transformer.

30. Apparatus according to claim 28 in which said isolating means comprises a transformer and a rectifier.

31. Apparatus according to claim 28 in which said isolating means comprises a transformer and a rectifier, and a high-frequency generator.

32. Apparatus according to claim 28 in which said isolating means comprises a transformer and a high-frequency generator.

33. Apparatus according to claim 28 having means for operating said reversing switch with power from a secondary winding of said transformer.

34. A method of converting heat energy into electrical energy, said method comprising ionizing the gas of an aerosol having a readily ionizable gas and charging the particles thereof, simultaneously increasing the velocity and decreasing the heat content of the said aerosol, passing said charged aerosol through a repelling electric field in the medium of a gas of high dielectric strength, and discharging said aerosol particles.

35. A method of converting heat energy into electrical energy, said method comprising ionizing the gas of an aerosol having a readily ionizable gas and charging the particles thereof, simultaneously increasing the velocity and decreasing the heat content of the said aerosol, passing said charged aerosol through a repelling electric field in the medium of a gas of high dielectric strength, and discharging said aerosol particles through an electrical load to said ionized gas.

36. A method of converting heat energy into electrical energy, said method comprising ionizing the gas of an aerosol having an initial positive velocity and charging the particles thereof, simultaneously increasing the velocity and decreasing the heat content of the said aerosol, passing said charged aerosol through a repelling electric field, and discharging said aerosol particles.

37. A method of converting heat energy into electrical energy, employing an aerosol having an initial positive velocity, comprising the steps of ionizing the gas and charging the particles of said aerosol, while simultaneously increasing the velocity and decreasing the heat content of the said aerosol, slowing the said charged particles by an electric field, and discharging said aerosol on a collector electrode.

38. In a method of converting heat energy into electrical energy through the medium of a suspension of particles entrained in a gas having an initial positive velocity, the steps comprising the simultaneous ionization of the said gas in an ionizer, the charging of the said particles with ions, and the expansion of said gas to increase the directed velocity thereof at the expense of the heat content of the gas, and the slowing of said charged medium in a repelling electric field and discharging of said charged particles on collector electrodes, whereby an electric current is caused to flow through an electrical load between said collector electrode and the ionizer.

39. The method of converting heat into electric energy that comprises decreasing the heat content of an aerosol having an initial positive velocity, converting such decrease to increased kinetic energy while simultaneously ionizing and charging said aerosol, converting a decrease in kinetic energy of said charged aerosol, obtained by passing said charged aerosol through a repelling electric field into an increased electric potential energy, and applying said aerosol to a load at said higher electric potential energy.

40. In the method of converting heat energy into electrical energy, the steps comprising producing a sheet-like zone of ionization in an aerosol having an initial positive velocity, creating opposing streams of said aerosol by separating positive and negative ions from said zone, simultaneously charging said opposing streams of said aerosol while decreasing the heat content and increasing the kinetic energy of said streams, passing said streams through repelling electric fields, and increasing the positive and negative potential energies of the positively and negatively charged aerosol, respectively, by decreasing the kinetic energies of said aerosol, and discharging said aerosol at increased positive and negative potential energies respectively.

41. The method according to claim 40 in which said steps are carried out in zones the cross-sectional area of which is large compared to the path length of said zones.

42. In a device for converting heat to electric energy, a first chamber, a second chamber, a plurality of nozzles coupling said chambers, means to supply an aerosol to said first chamber, means to ionize and charge said aerosol at the entrance to said nozzles, and an electric output circuit for discharging said aerosol, said circuit including a discharge electrode within said second chamber and a conductor coupling said discharge electrode with said ionizing means.

43. A method of converting heat energy into electrical energy, said method comprising ionizing the gas of an aerosol having an initial velocity and charging the particles thereof, decreasing the internal energy of the gas and simultaneously converting such decrease to kinetic energy, passing said charged aerosol through a repelling electric field, and discharging said aerosol particles.

ALVIN M. MARKS.

References Cited in the file of this patent

UNITED STATES PATENTS

| Number | Name | Date |
|---|---|---|
| 1,084,594 | Norton et al. | Jan. 13, 1914 |
| 1,363,037 | Goddard | Dec. 21, 1920 |
| 1,443,091 | Petersen | Jan. 23, 1923 |
| 1,717,413 | Rudenberg | June 18, 1929 |
| 1,964,738 | McCreary | July 3, 1934 |
| 2,004,352 | Simon | June 11, 1935 |
| 2,210,918 | Karlovitz et al. | Aug. 13, 1940 |
| 2,308,884 | Lindenblad | Jan. 19, 1943 |

FOREIGN PATENTS

| Number | Country | Date |
|---|---|---|
| 308,382 | Great Britain | Mar. 28, 1929 |
| 329,422 | Germany | Nov. 23, 1920 |